(12) United States Patent
Horigome

(10) Patent No.: US 8,098,560 B2
(45) Date of Patent: Jan. 17, 2012

(54) LIGHT SPOT POSITION CONTROL APPARATUS AND LIGHT SPOT POSITION CONTROL METHOD

(75) Inventor: Junichi Horigome, Tokyo (JP)

(73) Assignee: Sony Optiarc Inc., Tokyo (JP)

( * ) Notice: Subject to any disclaimer, the term of this patent is extended or adjusted under 35 U.S.C. 154(b) by 0 days.

(21) Appl. No.: 12/730,371

(22) Filed: Mar. 24, 2010

(65) Prior Publication Data

US 2010/0260022 A1    Oct. 14, 2010

(30) Foreign Application Priority Data

Apr. 10, 2009    (JP) ............................... P2009-095990

(51) Int. Cl.
*G11B 7/00* (2006.01)
(52) U.S. Cl. ................. 369/103; 369/124.03; 369/44.37
(58) Field of Classification Search .................. 369/103, 369/124.03, 44.37
See application file for complete search history.

(56) References Cited

U.S. PATENT DOCUMENTS

| | | | |
|---|---|---|---|
| 2003/0058756 A1 | 3/2003 | Kobori | |
| 2009/0245065 A1* | 10/2009 | Miyamoto et al. | 369/94 |
| 2010/0182889 A1* | 7/2010 | Inoue et al. | 369/103 |

FOREIGN PATENT DOCUMENTS

| | | |
|---|---|---|
| EP | 1 890 285 | 2/2008 |
| JP | 2005-250038 | 9/2005 |
| JP | 2007-79438 | 3/2007 |

OTHER PUBLICATIONS

European Search Report for Application No./Patent No. 10250447.9 - 1232 / 2239734 dated Dec. 14, 2010 from the European Patent Office.

* cited by examiner

*Primary Examiner* — Adam R Giesy
(74) *Attorney, Agent, or Firm* — Finnegan, Henderson, Farabow, Garrett & Dunner, L.L.P.

(57) ABSTRACT

Provided is a light-spot-position control apparatus including: a first-light-source; a second-light-source; a beam-splitter splitting a beam of the second-light-source into m beams; an optical-system allowing a first-beam of the first-light-source and the m beams to irradiate a disk-shaped recording-medium, where grooves and lands are alternately formed with an equal radial width to form the grooves in spiral/concentric shape through common-objective-lens, the optical-system allowing the three beams to irradiate the recording-medium so that an interval of m beam-spots is 1/m of track pitch; a tracking-control-mechanism tracking-controlling the beam by changing a relationship between the optical-axis and the recording-medium; a light-receiving unit individually receiving the m beams; an error-signal generator generating error-signals representing radial-position-errors of the spot-positions of the m beams with respect to the tracks based on received signals; an error-signal selector selecting at least one error-signal; and a servo-controller controlling the tracking-control-mechanism to tracking-servo the beam based on the error-signal.

6 Claims, 18 Drawing Sheets

| \* | \* | \* | \* | |
|---|---|---|---|---|
| 1 | 0 | 1 | 1 | Data0 |
| 1 | 1 | 0 | 1 | Data1 |

FIG. 4C

| \* | \* | \* | \* | \* | \* | \* | \* | \* | \* | \* | \* | 12 ch bit |
|---|---|---|---|---|---|---|---|---|---|---|---|---|
| 1 | 1 | 1 | 1 | 1 | 1 | 1 | 1 | 1 | 0 | 1 | 1 | Sync1 |
| 1 | 1 | 1 | 1 | 1 | 1 | 1 | 1 | 0 | 1 | 1 | 1 | Sync2 |

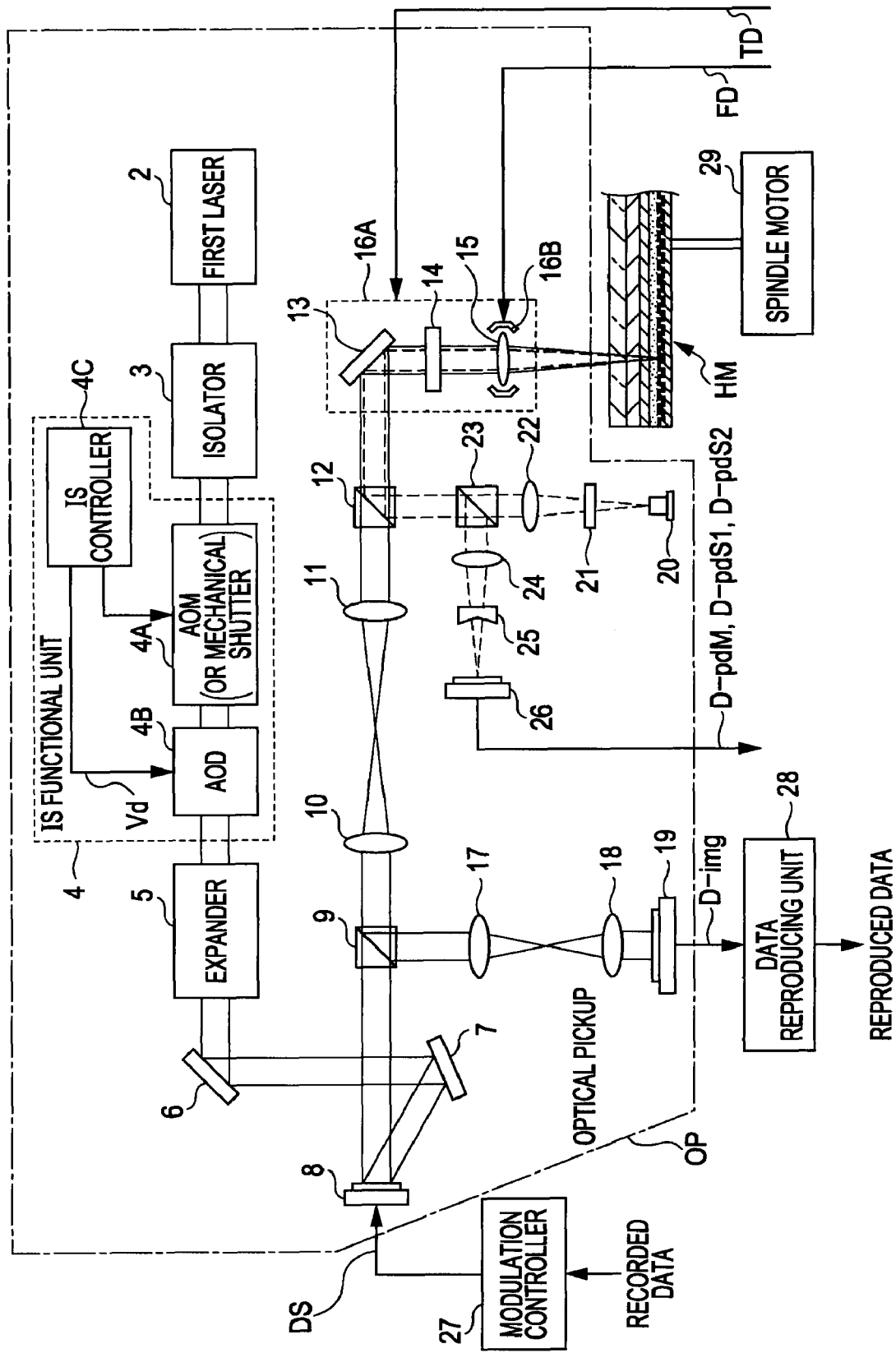

PRIOR ART

PRIOR ART

LIGHT SPOT POSITION CONTROL APPARATUS AND LIGHT SPOT POSITION CONTROL METHOD

BACKGROUND OF THE INVENTION

1. Field of the Present Invention

The present invention relates to a light spot position control apparatus for controlling spot positions of light irradiating a disk-shaped recording medium, and more particularly, to a light spot position control apparatus which is suitable for controlling information recording/reproducing positions based on irradiation of light different from information recording/reproducing light and a method thereof.

2. Description of the Related Art

For example, Japanese Unexamined Patent Application Publication Nos. 2005-250038 and 2007-79438 disclose a hologram recording/reproducing system which performs data recording by using an interference fringe between a signal light and a reference light. In the hologram recording/reproducing system, at the recording time, the interference fringe is formed on a hologram recording medium by allowing the signal light, which is subjected to spatial light modulation (for example, light intensity modulation) according to recording data, and the reference light, which is different from the signal light, to irradiate the hologram recording medium, so that the data recording is performed.

In addition, at the reproducing time, the hologram recording medium is irradiated with the reference light. In this manner, by irradiating the hologram recording medium with the reference light, a refracted light corresponding to the interference fringe formed on the hologram recording medium can be obtained. In other words, therefore, a reproducing light (reproducing signal light) corresponding to the recording data can be obtained. By detecting the obtained reproducing light with, for example, an image sensor such as a CCD (charge coupled device) sensor or a CMOS (complementary metal oxide semiconductor) sensor, the recording data are reproduced.

Similarly to a recording/reproducing system for an optical disk such as a CD (Compact Disc) or DVD (Digital Versatile Disc) in the related art, in a hologram recording/reproducing system, data are considered to be recorded in tracks formed on a recording medium. In other words, similarly to the case of the optical disk in the related art, recording/reproducing position control such as tracking servo control is performed on the tracks, so that the data are recorded at appropriate positions on the disk.

An example of a structure of the hologram recording medium used in the case of performing the recording/reproducing position control is described with reference to a cross-sectional structural view of FIG. 17.

FIG. 17 illustrates an example of a structure of a reflective hologram recording medium 100 having a reflecting layer.

As shown in the figure, in the hologram recording medium 100, a recording layer 106 where a hologram is recorded by the aforementioned interference fringe between the signal light and the reference light and a position control information recording layer where address information or the like for position control by a cross-sectional structure of convex-concave portions on a substrate 110 is recorded are separately formed.

More specifically, in the hologram recording medium 100, a cover layer 105, the recording layer 106, a reflecting layer 107, an intermediate layer 108, a reflecting layer 109, and the substrate 110 are formed in this order from the upper layer.

When a reproduced image corresponding to the hologram recorded on the recording layer 106 is obtained by irradiating a laser light (the aforementioned reference light) for hologram reproducing at the reproducing time, the reflecting layer 107 formed as the lower layer of the recording layer 106 is used to return the reproduced image as a reflected light to the apparatus side.

In addition, tracks for guiding the hologram recording/reproducing positions of the recording layer 106 are formed on the substrate 110 in a spiral or concentric shape. For example, the tracks are formed by recording information such as address information by using pit columns.

The reflecting layer 109 formed as the upper layer of the substrate 110 is provided so as to obtain a reflected light corresponding to the pit columns. In addition, the intermediate layer 108 is made of, for example, an adhesive material such as a resin.

The recording/reproducing light for performing the hologram recording/reproducing on the recording layer 106 and the position control light for obtaining the reflected light from the position control information recording layer are allowed to individually irradiate the hologram recording medium 100 having the cross-sectional structure.

Herein, if only one light is used simultaneously for the hologram recording/reproducing and the position control, at the reproducing time, the component corresponding to the cross-sectional shape of convex-concave portions of the substrate 110 (reflecting layer 109) is overlapped as a noise with the reproduced image of the hologram, so that the reproducing performance may deteriorate. For this reason, in the hologram recording/reproducing system, the position control is performed so that the position control light for obtaining the reflected light from the position control information recording layer together with the hologram recording/reproducing light is allowed to individually irradiate.

In addition, in the case where the position control light is irradiated separately with the hologram recording/reproducing light, the different wavelength bands thereof are used. If the position control light and the recording/reproducing light in the same wavelength band are used, the photo-sensing of the recording layer 106 may occur due to the irradiation of the position control light. In order to prevent this phenomenon, the different wavelength bands are used.

For example, a blue-violet laser light having a wavelength $\lambda$ of about 405 nm is used as the hologram recording/reproducing light, and a red laser light having a wavelength $\lambda$ of about 650 nm is used as the position control light.

Herein, in order to obtain the reflected light from the position control information recording layer through the irradiation of the position control light, the position control light necessarily reaches the reflecting layer 109, which is formed by reflecting the cross-sectional shape of convex-concave portions of the substrate 110. In other words, the position control light necessarily transmits the reflecting layer 107, which is formed above the reflecting layer 109.

On the other hand, the reflecting layer 107 necessarily reflects the hologram recording/reproducing light so that the reproduced image corresponding to the hologram recorded on the recording layer 106 returns to the apparatus side as a reflected light.

By taking this point into consideration, a reflecting layer having a wavelength selectivity, which reflects the blue-violet laser light as the aforementioned recording/reproducing light and transmits the red laser light as the aforementioned position control light is used as the reflecting layer 107. Accordingly, the position control light reaches the reflecting layer 109, so that the reflected light for the position control appropriately returns to the apparatus side; and the reproduced image of the hologram recorded on the recording layer 106 is reflected on the reflecting layer 107, so that the reflected light appropriately returns to the apparatus side.

Here, in the case where the recording/reproducing position control is performed by using the light separately from the hologram recording/reproducing light, as shown in FIG. 18, in the recording/reproducing apparatus side, the hologram recording/reproducing light and the position control light are combined in the same optical axis, and the combined light is allowed to irradiate the hologram recording medium 100. In addition, the tracking servo control is performed based on the reflected light of the position control light.

In this manner, the hologram recording/reproducing light and the position control light are combined on the same optical axis, and the combined light is allowed to irradiate the hologram recording medium 100. Next, the position control is performed based on the reflected light of the position control light, so that the hologram recording/reproducing position is controlled to be the position along the tracks (pit column) formed on the hologram recording medium 100.

However, the aforementioned method of controlling the hologram recording/reproducing position in the related art is a method based on the assumption that the optical axis of the position control light and the optical axis of the recording/reproducing light are coincident with each other. Therefore, for example, in the case where there occurs a misalignment between the two optical axes due to an aging change or a temperature change as shown in FIG. 19, the hologram recording/reproducing position may not be controlled to the accurate position according to the track.

In other words, as understood from this point, in the hologram recording/reproducing system of the related art, which performs the position control by using the aforementioned method, at the reproducing time, the recoded hologram column may not be accurately traced. As a result, the hologram reproducing may not be appropriately performed.

In addition, the problem of the misalignment between the hologram recording position and the reproducing position caused by the misalignment between the two optical axes may occur even in the case where the reproducing is performed on the disk on which the recording is performed by the different apparatus other than the current apparatus. For example, in the case where the axial misalignment amount between the position control light and the recording/reproducing light at the hologram recording time in the different apparatus is α, if the axial misalignment amount between the position control light and the recording/reproducing light in the current apparatus is β, the hologram recorded by the different apparatus may not be appropriately reproduced by the current apparatus.

Therefore, a procedure for correcting the misalignment between the hologram recording position and reproducing position is considered to be employed.

As a detailed procedure, there is a procedure of separately providing an adjusting mechanism such as an actuator for adjusting the axial position of the recording/reproducing light and, at the reproducing time, adjusting the axial position of the recording/reproducing light (reference light) so as to be coincident with the actual position at which the hologram is recorded.

More specifically, in the case where this procedure is employed, before the hologram reproducing is performed, calibration for specifying the axial position at which the largest reproducing light amount is to be obtained is performed by shaking the axial position of the recording/reproducing light (reference light) by the actuator (adjusting mechanism). In other words, accordingly, the position at which the hologram is actually recorded may be specified. Next, by adjusting the axial position of the recording/reproducing light to the obtained position, the misalignment between the hologram recording position and reproducing position may be corrected.

However, in the case where the procedure is employed, the actuator (adjusting mechanism) for adjusting the axial position of the recording/reproducing light is necessarily provided. Therefore, the production cost of the apparatus is increased.

In addition, a very high accuracy of adjustment is necessary to the correction of the misalignment between the recording position and the reproducing position. At the hologram reproducing time, although the misalignment in the position of irradiation of the recording/reproducing light (reference light) on the recorded hologram is small, the deterioration in the refraction efficiency (namely, the deterioration in the reproducing light amount) may occur. More specifically, a very high accuracy of adjustment, for example, an accuracy of about a submicron is necessary for the correction of the axial position of the recording/reproducing light.

Since such a very high accuracy of adjustment is necessary, in the case where the procedure of providing a separate adjusting mechanism for adjusting the axial position is employed, the technology thereof may be very difficult to implement. In addition, the adjusting mechanism may be a highly-accurate, highly-strong mechanism, so that the production cost of the apparatus is further increased.

SUMMARY OF THE INVENTION

According to an embodiment of the present invention, there is provided a light spot position control apparatus having the following configurations.

The light spot position control apparatus includes a first light source and a second light source.

In addition, the light spot position control apparatus includes a beam splitter that splits a light beam emitted from the second light source into m light beams.

In addition, the light spot position control apparatus includes an optical system that allows a first light beam emitted from the first light source and the m light beams generated by the beam splitter to irradiate a disk-shaped recording medium, where grooves and lands are alternately formed with an equal width in a radial direction thereof so that the grooves are formed in a spiral shape or a concentric shape, through a common objective lens, wherein the optical system allows the three types of light beams to irradiate the disk-shaped recording medium so that an interval of irradiating spots of the m light beams irradiating the disk-shaped recording medium in the radial direction is 1/m of a pitch of tracks formed on the disk-shaped recording medium according to the formation of the grooves.

In addition, the light spot position control apparatus includes a tracking control mechanism that is configured to perform tracking control on the light beam irradiated through the objective lens by changing a relative positional relationship between the optical axis of the light beam irradiated through the objective lens and the disk-shaped recording medium in the radial direction.

In addition, the light spot position control apparatus includes a light receiving unit that individually receives the m light beams irradiated through the objective lens from the disk-shaped recording medium.

In addition, the light spot position control apparatus includes an error signal generation unit that generates error signals representing radial position errors of the spot positions of the m light beams with respect to the tracks formed on the disk-shaped recording medium based on received signals obtained by the light receiving unit.

In addition, the light spot position control apparatus includes an error signal selector that selects at least one error signal among the error signals generated by the error signal generation unit.

In addition, the light spot position control apparatus includes a servo controller that controls the tracking control mechanism to perform the tracking servo on the light beam irradiated through the objective lens based on the error signal selected by the error signal selector.

The main features of the invention are as follows.

1) A disk-shaped recording medium where grooves and lands are alternately formed with an equal width in a radial direction is used.

2) A radial interval of irradiating spots of m-divided light beams of a second light is set to be 1/m of a track pitch of the disk-shaped recording medium.

3) The m-divided second light beams are individually received, so that error signals corresponding to the tracks of the spot positions of the light beams in the radial direction are generated.

4) One error signal is selected among the generated error signals, and a tracking servo is applied based on the selected error signal.

Herein, in the case where the conditions 1) and 2) are satisfied, if the tracking servo is performed individually on the error signals of the spots, the trace position (servo-object position) becomes the position that is shifted by 1/m of the track pitch. As understood from this relationship, according to the invention, the trace position of the spot may be selected among the positions corresponding to the m-divided portions of the track pitch as well as, typically, the center of the track. In other words, according to the invention, through the selection of the tracking error signal used for the tracking servo, the trace position of the light spot may be selected with a fine accuracy such as a width of 1/m of the track pitch.

As understood from this relationship, according to the invention, the tracking servo control capable of controlling the trace position of the first light in the radial direction in units of a width of 1/m of the track pitch may be implemented. In other words, the trace position of the hologram recording/reproducing light may be controlled in a finer unit than an accuracy exceeding the optical limit of the related art.

According to the invention, in the case where the irradiating position of the first light is controlled by performing the irradiating position control on the second light (the light from the second light source: the position control light), which is allowed to irradiate separately from the first light (the recording/reproducing light), the adjustment of the irradiating position of the first light for correcting the misalignment between the information recording position and reproducing position using the irradiation of the first light may be performed with a high accuracy in units finer than the track pitch.

In addition, according to the invention, the adjustment of the position of irradiation of the first light may be performed by the tracking servo based on the second light. In other words, as an adjusting mechanism for adjusting the position of irradiation of the first light, there may be used a tracking control mechanism that is already provided so as to implement the tracking servo. Therefore, unlike the related art, a separate axial position adjusting mechanism is not necessarily provided to the first light side. In other words, in terms of this point, the production cost of the apparatus may be reduced in comparison with an apparatus of the related art.

BRIEF DESCRIPTION OF THE DRAWINGS

FIGS. 4A to 4C are diagrams illustrating a format of address information.

FIG. 5 is a block diagram illustrating a main configuration of a hologram recording/reproducing system and a position control optical system of a recording/reproducing apparatus according to an embodiment of the invention.

DESCRIPTION OF THE PREFERRED EMBODIMENTS

Hereinafter, embodiments for embodying the invention (hereinafter, referred to as embodiments) will be described.

Figure 1:
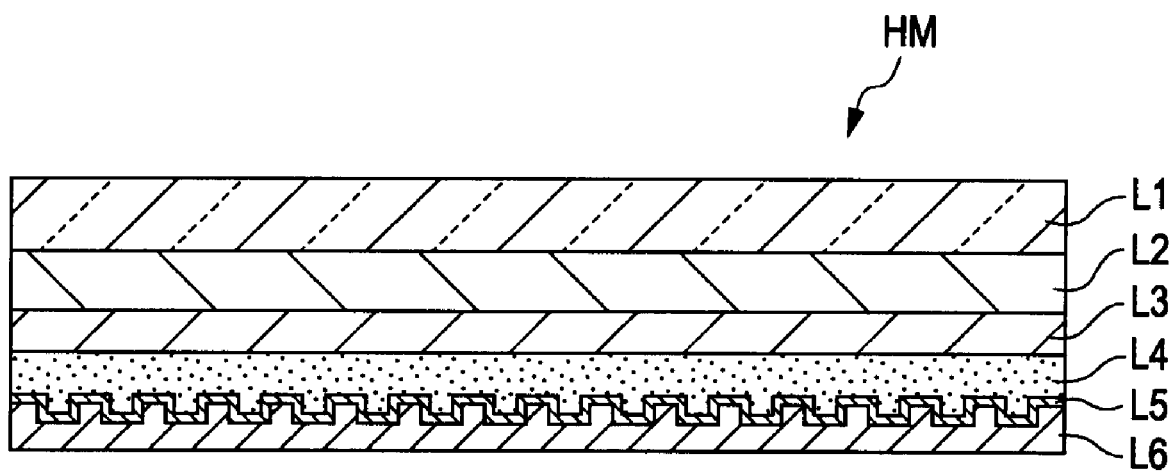
FIG. 1 is a cross-sectional view illustrating a cross-sectional structure of a disk-shaped recording medium according to an embodiment of the invention.

In addition, the description will be made in the following order.
1. Configuration of Recording Medium
  1-1. Cross-Sectional Structure
  1-2. Structure of Position Control Information Recording Layer
  1-3. Format of Address Information
2. Configuration of Recording/Reproducing Apparatus
  2-1. Hologram Recording/Reproducing System and Position Control Optical System
  2-2. Procedure of Fine Adjustment of Spot Position
  2-3. Configuration for Spot Position Control
3. Statistics of Embodiments
4. Modified Example
1. Configuration of Recording Medium
  1-1. Cross-Sectional Structure FIG. 1 illustrates a cross-sectional structure of a hologram recording medium HM as an embodiment of a disk-shaped recording medium according to an embodiment of the invention.

First, the hologram recording medium HM according to the embodiment is a reflective recording medium, which includes a reflecting layer L3 and a reflecting layer L5. In addition, a recording layer L2 where the hologram recording/reproducing is performed and a position control information recording layer where address information or the like for position control through a cross-sectional structure of convex-concave portions on a substrate L6 in the figure is recorded are individually formed on the hologram recording medium HM.

In addition, the hologram recording medium HM according to the embodiment is configured as a disk-shaped recording medium.

As shown in the figure, in the hologram recording medium HM, the cover layer L1, the recording layer L2, the reflecting layer L3, the intermediate layer L4, the reflecting layer L5, and the substrate L6 are formed in this order from the upper layer.

The cover layer L1 is constructed with, for example, a plastic substrate or a glass substrate. The cover layer L1 is provided so as to protect the recording layer L2.

As a material of the recording layer L2, for example, a photopolymer is selected. The hologram recording/reproducing is performed by using a blue-violet laser light (for example, having a wavelength λ of about 405 nm) from a first laser 2 as a light source described later in FIG. 5.

In addition, when a reproduced image corresponding to an interference fringe (data) recorded on the recording layer L2 is obtained by irradiating the blue-violet laser light as a reference light at the reproducing time, the reflecting layer L3 is used to return the reproduced image as a reflected light to the recording/reproducing apparatus side.

The substrate L6 and the reflecting layer L5 are provided so as to control the recording/reproducing positions.

The pit columns for guiding the hologram recording/reproducing positions of the recording layer L2 are formed on the substrate L6 in a spiral or concentric shape. In this case, as described later, the pit columns are formed by recording information such as address information through a pattern of pit existence.

The reflecting layer L5 is formed on a surface (superficial surface) of the substrate L6, where the pit columns are formed, by using, for example, a sputtering method or a vapor deposition method. The intermediate layer L4 formed between the reflecting layer L5 and the reflecting layer L3 is made of, for example, an adhesive material such as a resin.

Herein, as described later, in the embodiment, position control (tracking servo control or the like) is performed by using a reflected light that is obtained from the reflecting layer L5 by irradiating the hologram recording medium HM with a red laser light (for example, having a wavelength λ of about 650 nm) from a second laser 20 as a light source shown in FIG. 5, so that the hologram recording/reproducing positions are controlled by the blue-violet laser light.

In this case, in order to appropriately perform the position control, the red laser light necessarily reaches the reflecting layer L5, of which the cross section is provided with convex-concave portions for the position control. In other words, the red laser light necessarily transmits the reflecting layer L3, which is formed as an upper layer of the reflecting layer L5.

On the other hand, the reflecting layer L3 necessarily reflects the blue-violet laser light so that the reproducing light corresponding to the hologram recorded on the recording layer L2 returns to the recording/reproducing apparatus side as a reflected light.

By taking into consideration this point, a reflecting layer having a wavelength selectivity, which transmits the blue-violet laser light for the hologram recording/reproducing and transmits the red laser light for the position control, is used as the reflecting layer L3. In other words, the reflecting layer is configured to have a wavelength selectivity of reflecting a light in a specific wavelength band as the blue-violet laser light and transmitting a light outside the wavelength band.

Due to the reflecting layer L3 having the wavelength selectivity, the red laser light is allowed to appropriately reach the reflecting layer L5; the reflected light for the position control is appropriately detected at the recording/reproducing apparatus side; and the reproducing light of the hologram recorded on the recording layer L2 is appropriately detected in the recording/reproducing apparatus.

1-2. Structure of Position Control Information Recording Layer

Figure 2:
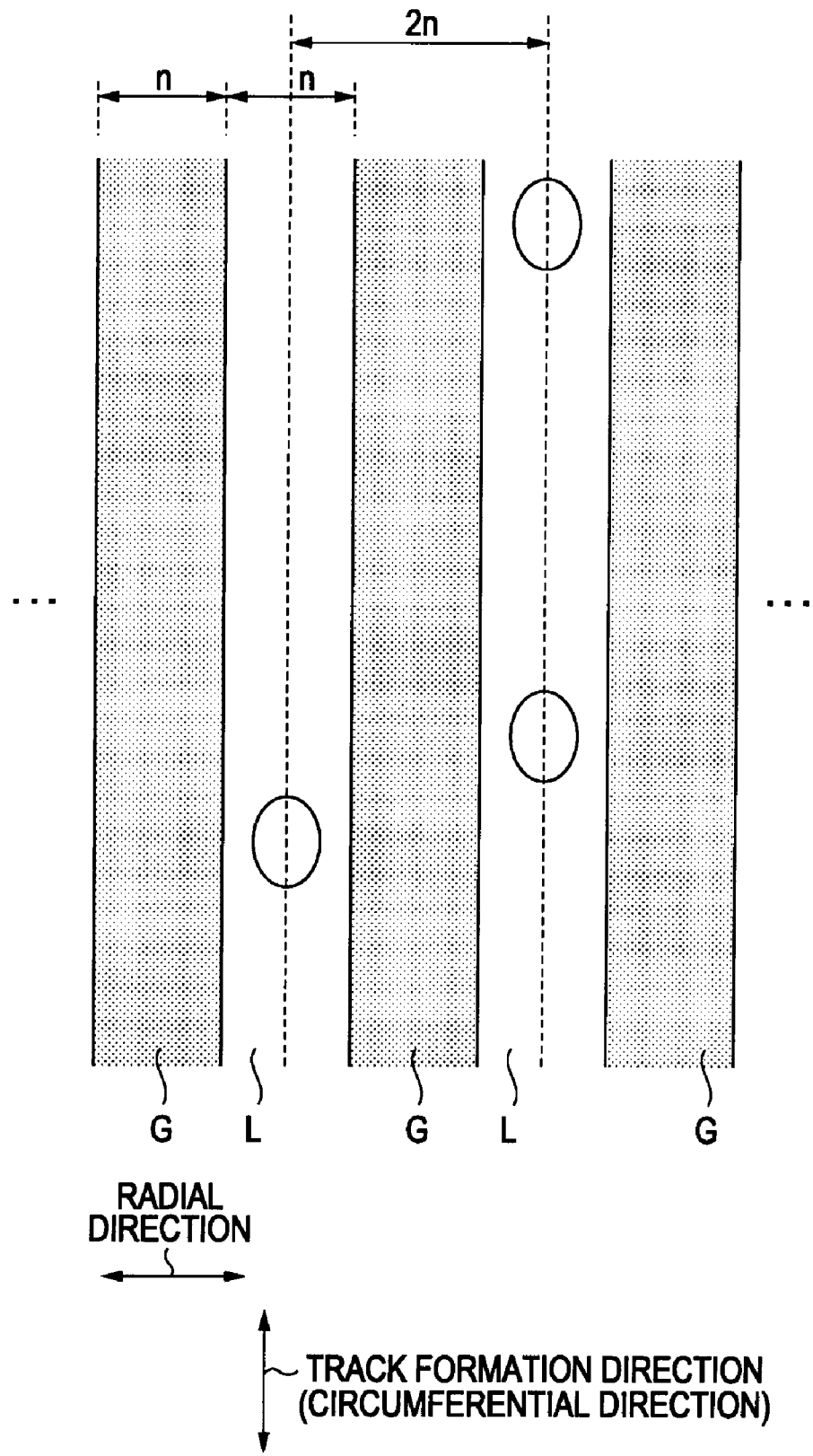
FIG. 2 is a partially enlarged (plan) view illustrating a surface of a position control information recording layer formed on the disk-shaped recording medium according to the embodiment.

FIG. 2 is a view (plan view) illustrating a partially enlarged surface of a position control information recording layer (which is formed by reflecting convex-concave portions of the substrate L6 into the reflecting layer L5) of the hologram recording medium HM.

In FIG. 2, the horizontal direction in the figure is the radial direction of the hologram recording medium HM and the arrangement direction of the tracks for guiding the spot positions, which are formed according to the formation of the later described grooves G.

In addition, the direction (the vertical direction) perpendicular to the radial direction is the direction of forming the tracks (the track formation direction: circumferential direction). The spots of the red laser light for the position control are moved in the direction parallel to the track formation direction according to the driving of rotation of the hologram recording medium HM.

As shown in FIG. 2, on the position control information recording layer of the hologram recording medium HM, the grooves G and the lands L are alternately arranged in the radial direction. More specifically, on the position control information recording layer, the grooves G are formed in a spiral shape or a concentric shape, so that the grooves G and the lands L are alternately formed in the radial direction.

In addition, in the embodiment, the grooves G and the lands L are configured to have the same width n. In other words, due to the width n, the grooves G are formed in a spiral shape or a concentric shape so that the formation pitch thereof in the radial direction is 2n.

In addition, in the embodiment, the recording of the address information through the formation of pits is performed on the side of the lands L. In addition, a detailed method of recording the address information in the case of the embodiment is described later.

Herein, the land (L) formation pitch is equal to the groove (G) formation pitch (=2n). As understood therefrom, in the case, the pitch of formed tracks (track pitch) is 2n.

Figure 3:
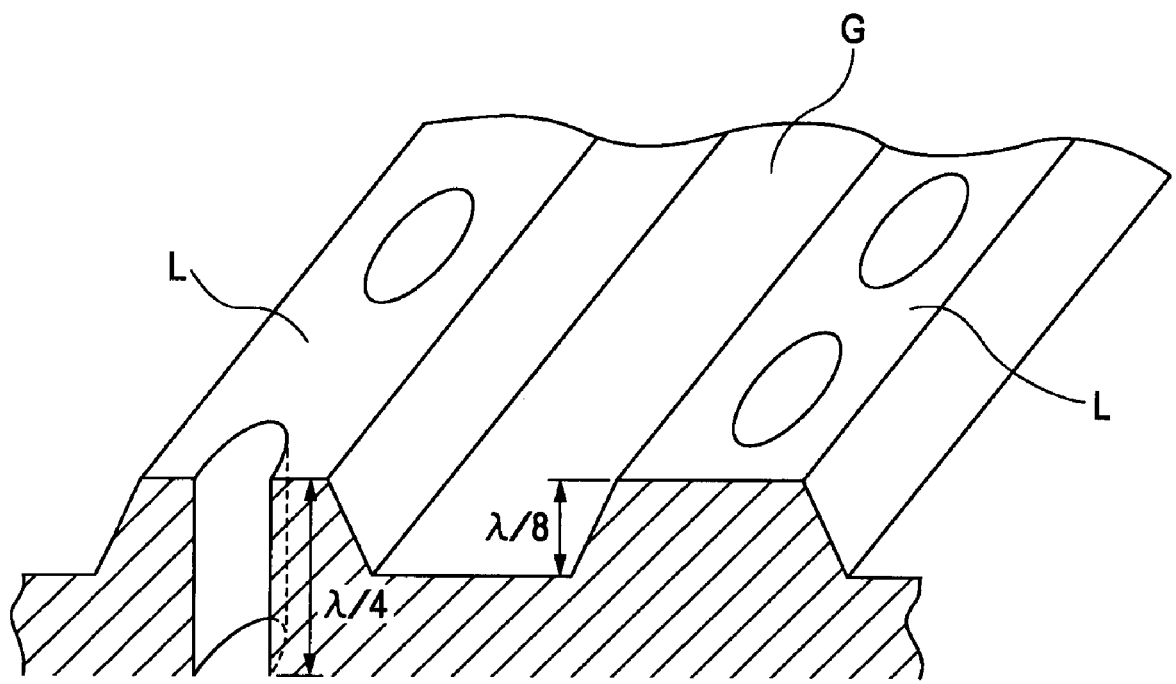
FIG. 3 is a perspective cross-sectional view illustrating a portion of the position control information recording layer.

FIG. 3 is a perspective cross-sectional view illustrating a partially enlarged portion of the substrate L6 of the hologram recording medium HM.

Herein, if a reproducing wavelength (in this case, a wavelength of the aforementioned red laser light) for the position control information recording layer is denoted by λ, in the embodiment, as shown in the figure, a depth of the groove G is set to λ/8, and a depth of the pit is set to λ/4.

As described later, in the embodiment, a Push Pull signal is generated as a tracking error signal. In terms of a signal amplitude of the Push Pull signal, the depth setting of λ/8 is most advantageous, and the depth setting of λ/4 is most disadvantageous.

As described later, a stabilized tracking servo can be implemented through the depth setting of the groove G and the depth setting of the pit.

Herein, the position control information recording layer having the structure shown in FIGS. 2 and 3 is formed, and the cutting of the substrate L6 is performed by a two-beam cutting method. More specifically, in this case, as the cutting, there is used the two-beam cutting method, where the interval between the optical axes is set to n; the groove-forming laser beam and the pit-forming laser beam are used; and (power of the groove-forming laser): (power of the pit-forming laser) =1:2.

1-3. Format of Address Information

Next, an example of a formation of address information which is recorded on the position control information recording layer is described with reference to FIGS. 4A to 4C.

In FIGS. 4A to 4C, FIG. 4A is a view illustrating a procedure of forming pits for the lands L.

First, in the embodiment, a procedure of recording information according to lengths of pits and spaces like CD (compact disc) or DVD (digital versatile disc) is not employed, but the information recording is performed according to a pattern of pit existence at predetermined pit formable positions.

More specifically, first, in the embodiment, in order to suppress the influence of the pits on the tracking error signal as small as possible, the pit length is set to the shortest length. In the embodiment, since the recording/reproducing conditions of the position control information recording layer are set to be similar to those of the case of DVD (wavelength λ= about 650 nm and aperture number NA= about 0.60), the shortest pit length is 3T.

In addition, in the embodiment, one pit formable position is allocated to a plurality of unit intervals, where the shortest pit length is set to a length of one unit interval. More specifically, in this case, the pit formable position is allocated every six unit intervals (namely, occurs every five unit intervals).

In FIG. 4A, the mark "*" indicates the unit interval corresponding to the pit formable position; and the mark "0" between the marks "*" indicates the unit interval corresponding to no pit formable position.

In addition, in the embodiment, there is employed a format representing "0" and "1" of the channel data according to the pit existence at the pit formable position. In other words, one pit formable position is allocated to information corresponding to one channel bit.

In the embodiment, one bit of the data bits is represented by the data pattern having a plurality of channel bits "0" and "1".

More specifically, in the embodiment, as shown in FIG. 4B, the "0" and "1" of the data bits are represented by the four channel bits. For example, the 4-channel-bit pattern "1011" may represent the data bit "0"; and the 4-channel-bit pattern "1101" represents the data bit "1".

Herein, the important point is that the channel bits "0" are not consecutively arranged. In other words, in the recording/reproducing apparatus side, the clock is generated according to the pit formation period. At this time, if the channel bits "0" are consecutively arranged (namely, if the pit formable positions where pits are not formed are consecutively arranged}, an appropriate clock may not be obtained. For this reason, in the embodiment, the condition that the channel bits "0" are not consecutively arranged is satisfied, for example, through the aforementioned definition of the data bit. In other words, due to the aforementioned definition of the data bit, deterioration in reliability of the clock may be suppressed.

FIG. 4C illustrates an example of a sync pattern.

For example, as shown in the figure, the sync pattern is represented by 12 channel bits. The front 8 bits represent the channel bit pattern "11111111" which does not match with the definition of the data bit, and the rear 4-channel-bit pattern represents a type of the sync. More specifically, if the 4-channel-bit pattern following the 8 bits is "1011", the type of the sync is Sync 1; and if "0111", the type is Sync 2.

In the hologram recording medium HM according to the embodiment, the address information is recorded following the aforementioned sync.

Herein, the address information recorded includes at least radial position information and angular position information.

2. Configuration of Recording/Reproducing Apparatus 2-1. Hologram Recording/Reproducing System and Position Control Optical System FIG. 5 mainly illustrates only configurations of a hologram recording/reproducing system and a position control optical system, which are extracted among internal configurations of the recording/reproducing apparatus that performs the hologram recording/reproducing on the hologram recording medium HM according to the aforementioned embodiment.

First, in the recording/reproducing apparatus according to the embodiment, a so-called coaxial scheme is employed as a hologram recording/reproducing scheme. In other words, the signal light and the reference light are disposed on the same axis, and the information recording using the interference fringe is performed by allowing the signal light and the reference light to irradiate the hologram recording medium HM set at a predetermined position. In addition, at the reproducing time, the reproducing of the information recorded using the interference fringe is performed by allowing the reference light to irradiate the hologram recording medium HM.

In FIG. 5, a spindle motor 29 for driving the rotation of the hologram recording medium HM is disposed in the recording/reproducing apparatus. When the hologram recording medium HM is loaded on the recording/reproducing apparatus, the state where the hologram recording medium HM is driven to rotate by the spindle motor 29 is maintained.

The hologram page is recorded or reproduced by allowing a first laser 2 in the figure to irradiate the loaded hologram recording medium HM.

The first laser 2 is constructed with, for example, an external-resonator-attached laser diode to emit a blue-violet laser light having a wavelength λ of about 405 nm. Hereinafter, the laser light from the first laser 2 as a light source is referred to as a recording/reproducing laser light or a first laser light.

The recording/reproducing laser light emitted from the first laser 2 passes through an isolator 3 and an AOM (acoustic optical modulator) 4A->an AOD (acoustic optical deflector) 4B, which are included in an IS (image stabilizing) functional unit 4. Next, a beam diameter of the recording/reproducing laser light is adjusted to a necessary value by an expander 5. The recording/reproducing laser light is incident to an SLM (spatial light modulator) 8 through a mirror 6->a mirror 7.

In addition, the IS functional unit 4 is described later.

The SLM 8 performs the spatial light modulation on the incident recording/reproducing light so as to generate the aforementioned reference light and signal light. As the SLM 8, there is employed, for example, a refraction type spatial light modulator where a plurality of micro-mirrors are disposed, or a device for performing spatial light modulation in units of a pixel by using a liquid crystal panel. Therefore, a signal light reflecting the recording data or a reference light having a predetermined intensity pattern may be generated.

Figure 6:
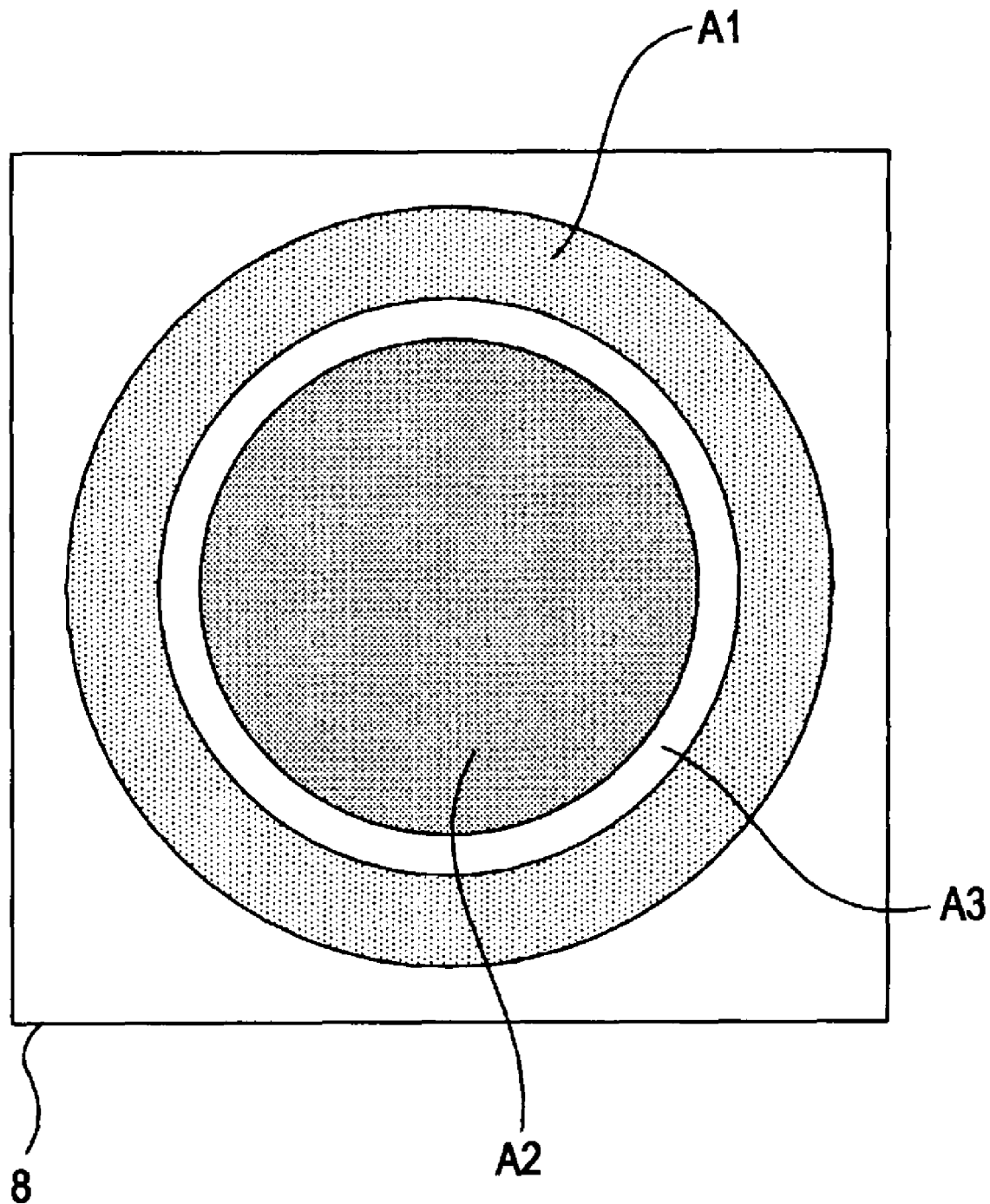
FIG. 6 is a diagram illustrating areas set by spatial light modulation (SLM).

Herein, in the case where the coaxial scheme is employed as the hologram recording/reproducing scheme, in the SLM 8, the areas shown in FIG. 6 are set as follows.

As shown in FIG. 6, in the SLM 8, a circular signal light area A2 is formed at the central portion thereof, and an annular reference light area A1 is defined by forming an annular gap area A3 along the outer circumferential portion of the signal light area A2. The signal light area A2 is an area that is set as a signal light generating area. Similarly, the reference light area A1 is an area that is set as a reference light generating area.

In addition, the gap area A3 is set as a buffer area for preventing the light beam of the reference light area A1 and the light beam of the signal light area A2 from interfering with each other and generating noise.

Returning to FIG. 5, the SLM 8 is configured to generate the signal light and the reference light based on the driving signal DS from the modulation controller 27 in the figure at the recording time and to generate the reference light based on the driving signal DS at the reproducing time.

At the recording time, the modulation controller 27 allocates a driving signal value to each pixel so that a pattern of pixels (for example, an ON/OFF pattern of each pixel) in the signal light area A2 becomes a pattern corresponding to the input recording data in the SLM 8. In addition, the modulation controller 27 allocates a driving signal value to each pixel so that the pattern of pixels in the reference light area A1 becomes a predetermined pattern and so that all the pixels in the other area including the gap area A3 turn OFF. Next, the driving signal DS as the value designated above is applied to the SLM 8. Accordingly, at the recording time, the signal light having a light intensity pattern corresponding to the recorded data and the reference light having a predetermined light intensity pattern are generated from the SLM 8.

In addition, at the reproducing time, the driving signal value is set so that only the pixel pattern in the reference light area A1 becomes a predetermined pattern and so that the other areas turn OFF, and the pixels of the SLM 8 are driven. Accordingly, only the reference light is output from the SLM 8.

The light that is subjected to the spatial light modulation in the SLM 8 is incident to the polarized beam splitter 9 as shown in the figure. The polarized beam splitter 9 transmits the recording/reproducing laser light that is incident from the SLM 8.

The laser light that passes through the polarized beam splitter 9 is incident to the dichroic mirror 12 through a relay lens system of the relay lens 10->the relay lens 11.

The dichroic mirror 12 has wavelength selectivity and is configured to transmit the recording/reproducing laser light that is incident through the relay lens system and to reflect the position control laser light from the later-described second laser 20 as a light source.

Therefore, the recording/reproducing laser light passing through the relay lens system passes through the dichroic mirror 12.

The optical axis of the recording/reproducing laser light passing through the dichroic mirror 12 is bent at 90° by the mirror 13, so the recording/reproducing laser light is incident to the ¼ wavelength plate 14. Next, the recording/reproducing laser light passing through the ¼ wavelength plate 14 is allowed to irradiate the hologram recording medium HM through the objective lens 15.

The objective lens 15 is sustained so as to be displaceable in the focus direction (the direction of departing from or approaching the hologram recording medium HM) by the focus actuator 16B. In addition, the objective lens 15, the focus actuator 16B, and the ¼ wavelength plate 14, and the mirror 13 are configured so as to be integrally displaceable in the tracking direction (the radial direction of the hologram recording medium HM) by the tracking actuator 16A.

The tracking actuator 16A and the focus actuator 16B are applied with the tracking drive signal TD and the focus drive signal FD from the later described servo circuit 38 (refer to FIG. 13). Therefore, the control of the relative positional relationship between the light, which irradiates the hologram recording medium HM through the objective lens 15, and the hologram recording medium HM in the radial direction and the control of focusing the light, which irradiates the hologram recording medium HM through the objective lens 15, are performed, so that the servo operations for focusing and tracking or the track jumping operation may be implemented.

In addition, although omitted for simplifying the illustration, in the actual case, a slide mechanism for changing the positional relationship in the tracking direction between the optical pickup OP including the objective lens 15 and the hologram recording medium HM is also provided.

Herein, in the spatial light modulation at the recording time using the aforementioned SLM 8, the signal light and the reference light are generated based on the recording/reproducing laser light from the first laser 2 as a light source. In other words, at the recording time, the signal light and the reference light are allowed to irradiate the hologram recording medium HM. Therefore, by the interference fringe (hologram) between the signal light and the reference light, data are recorded on the hologram recording medium HM (recording layer L2).

In addition, at the reproducing time, only the reference light is generated by the SLM 8, and the reference light is allowed to irradiate the hologram recording medium HM through the light path described above. According to the irradiation of the reference light on the hologram recording medium HM, the refracted light (reproduced image) corresponding to the interference fringe can be obtained. The obtained reproduced image is allowed to return to the apparatus side as a reflected light from the reflecting layer L3 formed on the hologram recording medium HM.

The returning light is converted into a parallel light through the objective lens 15. Next, the returning light is incident to the polarized beam splitter 9 through the ¼ wavelength plate 14->the mirror 13->the dichroic mirror 12->the relay lens 11->the relay lens 10.

Herein, the returning light incident to the polarized beam splitter 9 from the hologram recording medium HM is converted into a linearly polarized light, of which the polarizing direction is perpendicular to the linearly polarized light passing through the polarized beam splitter 9 in a forward path, by the functions of the ¼ wavelength plate 14 and the reflecting layer (L3) formed on the hologram recording medium HM.

Accordingly, the returning light from the hologram recording medium HM is reflected by the polarized beam splitter 9.

The returning light reflected by the polarized beam splitter 9 is incident to the image sensor 19 through the relay lens system of the relay lens 17->the relay lens 18 as shown in the figure.

The image sensor 19 is constructed with, for example, a CCD (charge coupled device) sensor or a CMOS (complementary metal oxide semiconductor) sensor to receive the returning light incident from hologram recording medium HM and convert the returning light into an electrical signal, so that an image signal is obtained. Therefore, the obtained image signal is configured to reflect the light intensity pattern (that is, a "0" "1" pattern) that is allocated to the signal light at the recording time. In other words, the image signal detected by the image sensor 19 becomes the reading signal of the data recorded on the hologram recording medium HM.

In addition, the reading signal (image signal) obtained by the image sensor 19 is denoted by the reading signal D-img.

The data reproducing unit 28 is input with the reading signal D-img obtained by the image sensor 19 and performs a predetermined signal process (decoding process) to reproduce the recorded data that are constructed in a combination of binary values of "0" and "1".

In addition, in the generation of the recording data of "0" and "1", a signal processing method of identifying the data of "0" and "1" is performed on the reading signal D-img of the image sensor 19 in units of a data pixel of the SLM 8. In this manner, there are various methods as the reproducing signal processing method of reproducing the recording data of "0" and "1" from the output of the image sensor 19, and thus, the invention is not particularly limited thereto.

Herein, the above description of the hologram recording/reproducing method is maintained, and the aforementioned IS functional unit 4 is described.

Similarly to the case of the embodiment, in the case where the hologram recording/reproducing is performed while the hologram recording medium HM is driven to rotate, in order to allow the recording/reproducing laser light to irradiate the same position on the recording medium continuously for a predetermined time, the scanning with the recording/reproducing laser light is performed every predetermined interval. In other words, by performing the scanning with the laser light, for example, at the recording time, the interference fringe may be more surely formed; and at the reproducing time, the detected light amount is increased, so that the reading may be more surely performed. Accordingly, the function of performing the scanning every predetermined interval by allowing the recording/reproducing laser light to irradiate the same position on the recording medium for only the predetermined time is referred to as an IS (image stabilizing) function.

In FIG. 5, the IS functional unit 4 includes an AOM 4A, and an AOD 4B, and an IS controller 4C for controlling driving these components as shown in the figure.

The AOM 4A is driven by, for example, a high frequency signal having a frequency of about one hundred and several tens of MHz. The AOM 4A is configured to have a device (acoustic optical medium), of which the transmittance varies with a change in the amplitude of the high frequency signal. In other words, due to the change in the transmittance, the AOM 4A may function as a shutter.

In addition, although the AOD 4B is driven according to a high frequency signal similarly to the AOM 4A, the AOD 4B is configured to have an acoustic optical medium that is configured to change the deflecting angle of light according to a change in the frequency of the high frequency signal. The AOD 4B performs the scanning with the incident laser light through the control of the deflecting angle.

Herein, for the IS function, in order to allow the laser light to sequentially irradiate the positions for a predetermined time, a blanking period when the laser spot is moved from a position to another position may be necessarily provided. If the laser light is allowed to continuously irradiate in the blanking period, a large amount of the recording materials may react. Particularly, at the recording time, a latent image associated with the movement of the laser spot may remain on the recording-completed hologram (refractive grating), which results in noise.

For this reason, in order to implement the IS function, there may be necessarily provided a unit (AOD 4B) for performing scanning with the laser light and a shutter (AOM 4A) for preventing the reaction of the recording materials by greatly decreasing the transmittance of the laser light in the blanking period.

In the IS functional unit 4, the IS controller 4C controls the driving of the AOM 4A and the AOD 4B by generating a change in the deflecting angle and the transmittance of the laser light for implementing the aforementioned image stabilizing function. More specifically, the AOD 4B is applied with a driving signal having a saw-tooth waveform for obtaining the scanning operation every predetermined interval, and on the other hand, the AOM 4A is applied with a driving signal having a square waveform for allowing the laser light to transmit in the scanning period of the AOD 4B and allowing the laser light to be blocked in the blanking period between the scanning periods. Accordingly, the IS function is implemented.

In addition, as shown in the figure, a mechanical shutter may be used instead of the AOM 4A.

Next, an optical system for controlling recording/reproducing positions using recording/reproducing laser light is described.

In FIG. 5, the position control optical system includes a second laser 20, a grating 21, a collimating lens 22, a polarized beam splitter 23, a condensing lens 24, a lens 25, and a light receiving unit 26.

The second laser 20 is configured so as to emit a laser light having a wavelength different from that of the recording/reproducing laser light emitted from the first laser 2 as a light source. More specifically, in this case, the second laser 20 is configured so as to be the aforementioned red laser light having a wavelength of about 650 nm.

The light (position control laser light) emitted from the second laser 20 is incident to the polarized beam splitter 23 through the grating 21->the collimating lens 22.

The grating 21 divides the light beam emitted from the second laser 20 into three light beams, that is, a main light beam, a first sub light beam, and a second sub light beam 3. The three light beams are incident to the collimating lens 22.

In addition, in FIG. 5, for simplifying the illustration, the position control laser light beams using the three light beams are collectively indicated by one light flux.

The position control laser light incident to the polarized beam splitter 23 passes through the polarized beam splitter 23 and is incident to the dichroic mirror 12.

As described above, the dichroic mirror 12 is configured so as to reflect the position control laser light from the second laser 20. Similarly to the aforementioned recording/reproducing laser light, the position control laser light reflected by the dichroic mirror 12 is allowed to irradiate the hologram recording medium HM through the mirror 13->the ¼ wavelength plate 14->the objective lens 15.

Herein, in the recording/reproducing apparatus according to the embodiment, the optic system is adjusted so that the optical axis of the main light beam disposed at the center among the three light beams is coincident with the optical axis of the recording/reproducing laser light by the dichroic mirror 12.

In addition, as understood from the description, the dichroic mirror 12 is a device for combining the recording/reproducing laser light and the main light beam in the same optical axis and performing irradiation on the hologram recording medium HM.

Since the reflecting layer L3 has the wavelength selectivity, the position control laser light that irradiates the hologram recording medium HM through the objective lens 15 is allowed to reach the reflecting layer L5 (position control information recording layer) that is disposed as a lower layer thereof. In other words, as a result, the reflected light that reflects the convex-concave portions (grooves G or pits) formed on the position control information recording layer can be obtained. The reflected light (returning light) from the reflecting layer L5 is allowed to return to the apparatus side through the objective lens 15.

The returning light of the position control laser light passing through the objective lens 15 is incident to the dichroic mirror 12 through the ¼ wavelength plate 14->the mirror 13. The returning light of the position control laser light is reflected by the dichroic mirror 12, and the reflected light is incident to the polarized beam splitter 23. Similarly to the aforementioned polarized beam splitter 9, the incident returning light is reflected by the polarized beam splitter 23. As a result, the returning light of the position control laser light is allowed to irradiate on a light receiving surface of the light receiving unit 26 through the condensing lens 24->the lens 25 as shown in the figure.

The light receiving unit 26 receives the returning light of the irradiating position control laser light to obtain the received signal D-pd corresponding to the convex-concave portions of the position control information recording layer of the hologram recording medium HM.

Herein, in the embodiment, the position control laser light is divided into three light beams. The light receiving unit 26 includes three detectors (photodetectors 26M, 26S1, and 26S2) for individually receiving the reflected light beams of the three light beams described later. Accordingly, as the received signals D-pd of the light receiving unit 26, the individually received signals D-pdM, D-pdS1, and D-pdS2 can be obtained from the detectors.

The fine adjustment control of spot positions and the address information detection according to the embodiment described hereinafter may be performed based on the received signal (reflected light signal) D-pd of the position control laser light obtained by the light receiving unit 26.

In addition, detailed configurations for performing the fine adjustment of spot positions and the address information detection according to the embodiment are described below.

2-2. Procedure of Fine Adjustment of Spot Position

The description of the configuration of the recording/reproducing apparatus is maintained, and the procedure of fine adjustment of spot positions according to the embodiment is described hereinafter.

Herein, as described above with reference to FIG. 19, in the case where the hologram recording/reproducing position is controlled by using a light beam different from the hologram recording/reproducing light, a misalignment between the two optical axes may occur due to, for example, an aging change or a temperature change. In addition, in the case where such a misalignment between the optical axes occurs, although the position control such as the tracking servo is performed by using the reflected light of the position control laser light, there is a problem in that the hologram recording/reproducing position may not be controlled to be an accurate position along a desired pit column.

In other words, in terms of this point, in the hologram recording/reproducing system of the related art, at the reproducing time, the recorded hologram column may not accurately traced, so that the hologram reproducing may not be appropriately performed.

In addition, in the case where the reproducing is performed on a disk where the recording is performed by an apparatus different from the current apparatus, there may also occur the problem of the misalignment between the hologram recording position and reproducing position due to the misalignment between the two optical axes. For example, in the case where the axial misalignment amount between the position control light and the recording/reproducing light at the hologram recording time in the different apparatus is $\alpha$, if the axial misalignment amount between the position control light and the recording/reproducing light in the current apparatus is $\beta$, the hologram recorded by the different apparatus may not be appropriately reproduced by the current apparatus.

Therefore, in the hologram recording/reproducing system, a procedure for correcting the misalignment between the hologram recording position and reproducing position is necessarily provided.

However, herein, it is noted that, at the hologram reproducing time, infinitesimal misalignment in the position of irradiation of the recording/reproducing light (reference light) on the recorded hologram leads to deterioration in refraction efficiency (that is, a decrease in reproducing light amount). In other words, accordingly, when the correction of the reproducing position with respect to the hologram recording position is performed, the adjustment may be necessarily performed at a very high accuracy.

More specifically, the adjustment accuracy may be set to be an accuracy of, for example, about a submicron.

By taking this point into consideration, in the embodiment, there is proposed a procedure for fine adjustment of spot positions, which is very suitable for the case of performing the correction of the misalignment between the hologram recording position and the reproducing position.

First, a detailed procedure for correcting a difference between the hologram recording position and the hologram reproducing position is described with reference to FIG. 7.

Figure 7A:
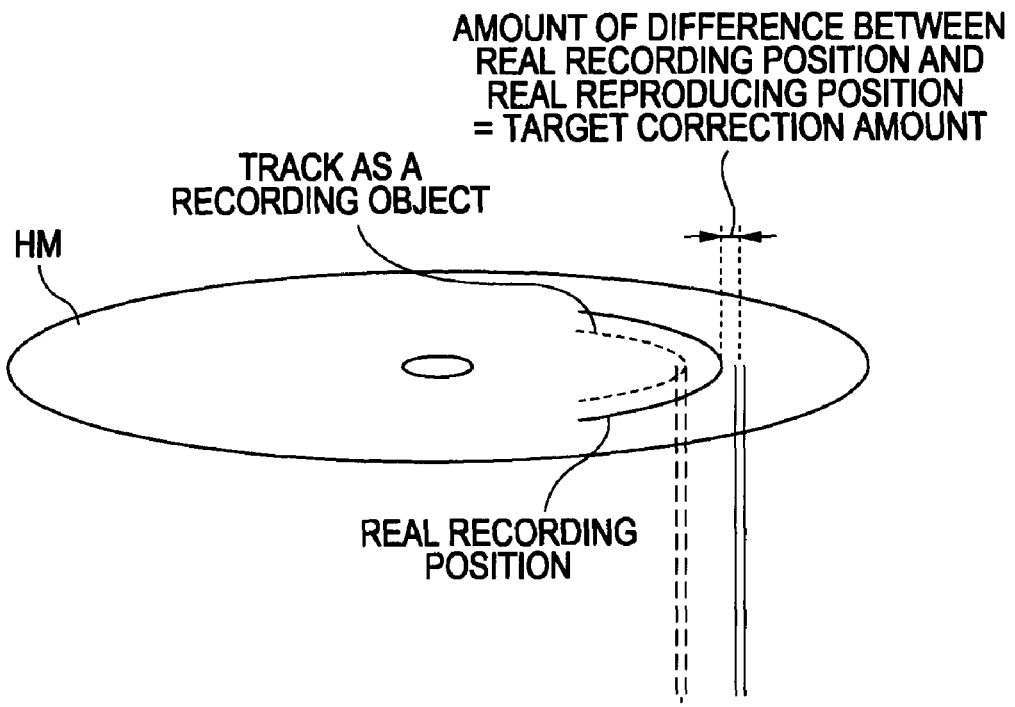
FIGS. 7A and 7B are diagrams illustrating a detailed procedure for correcting (adjusting) a misalignment between a hologram recording position and a hologram reproducing position.

FIG. 7A diagrammatically illustrates a misalignment between the hologram recording position and the hologram reproducing position.

Figure 19:
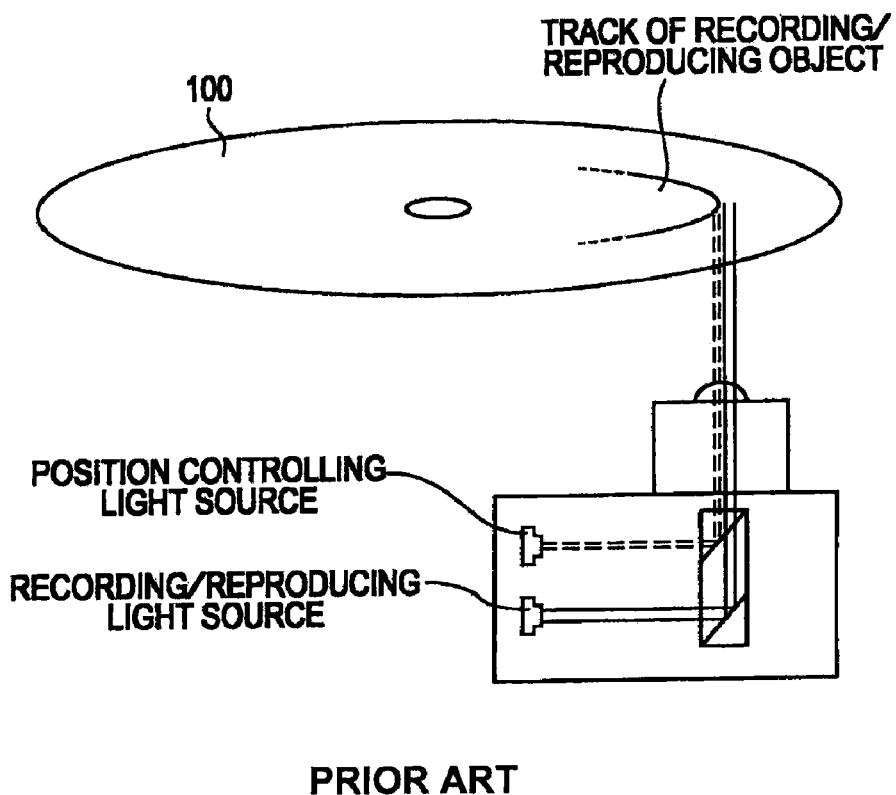
FIG. 19 is a diagram illustrating axial misalignment between a recording/reproducing light and a position control light that irradiates a hologram recording medium.

First, in the case where the axial misalignment between the hologram recording/reproducing light and the position control light occurs as described above, although the hologram recording is performed on a pit column (address) at the recording time, the actually-recorded hologram column (hologram recording position) is not formed on the objective pit column (the aforementioned state in FIG. 19). In this case, if the misalignment amount between the two optical axes at the reproducing time is the same as that at the recording time, there is no problem. However, the axial position misalignment amount at the reproducing time is not always the same as that at the recording time (due to a temperature change or a difference between the apparatuses). Therefore, as shown in FIG. 7A, even in the case where the reproducing is performed by tracing the objective pit column at the reproducing time, the misalignment between the actual hologram recording position and reproducing position occurs, the appropriate reproducing may not be performed.

Figure 7B:
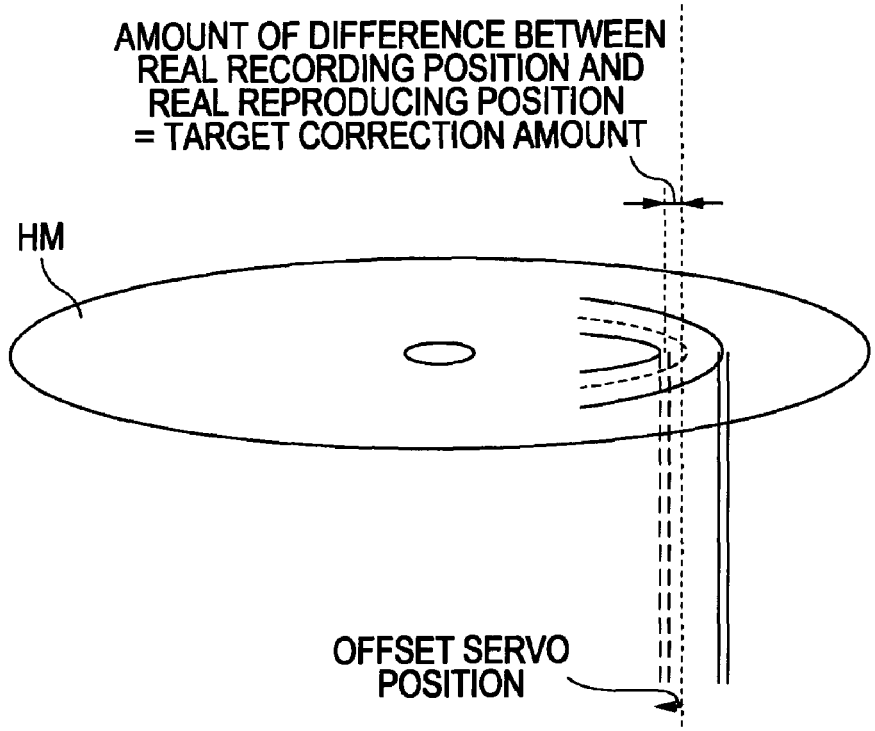

Therefore, the misalignment amount between the actual recording position and reproducing position is detected by a procedure, and after that, as shown in FIG. 7B, the misalignment amount is set to a target correction amount, and the servo position is offset by the correction amount. Accordingly, the correction is performed so that the position of irradiation of the recording/reproducing light may be located at the actual recording position.

Herein, as clarified from the later description, in the recording/reproducing apparatus according to the embodiment, the trace position of the recording/reproducing light (the trace position of the main light beam) according to the tracking servo is set so as to be selected as an interval smaller than the track pitch. Accordingly, the adjustment width according to the offset of the servo position may be set to very small. In other words, therefore, the correction may be performed at a higher accuracy than the accuracy exceeding the optical limit of the related art.

Herein, in this case, the hologram recording may be performed, for example, on the lands L formed on the hologram recording medium HM. In other words, in this case, at the recording time, by the tracking servo control based on the reflected light of the central main light beam, the hologram recording is performed while the spots of irradiation of the main light beam are allowed to trace the lands L (ideally, the positions of the spots are coincident with the positions of irradiation of the recording/reproducing light). For example, in the case where the hologram recording is performed on the land L, the hologram recording pitch in the radial direction is coincident with the pitch of the formed lands L (track pitch).

In this case, the fine adjustment of axial position is considered to be performed through the selection of the tracking servo position, since the adjustment width may be implemented to be finer as the track pitch is smaller, it is preferable that, the track pitch is decreased, for example, down to substantially the optical limit.

However, in the case where the track pitch is decreased down to substantially the optical limit, if the recording is performed so that the hologram recording pitch is equal to the pitch of the formed lands L, the hologram recording pitch is excessively narrowed. In general, the hologram recording pitch is wider than the minimum track pitch obtainable in the case of DVD. Therefore, if the recording is performed such that (hologram recording pitch)=(track pitch), the hologram may not be appropriately reproduced.

Therefore, in the embodiment, the hologram recording is performed so that the recording pitch is wider than the track pitch.

For example, in the case where the appropriate hologram recording pitch in the radial direction is set to correspond to ten tracks (in this case, ten lands L), a procedure of completing the recording on the one-circumference of track and, after that, performing the recording while sequentially jumping the ten tracks may be employed for the hologram recording. In other words, the hologram recording is performed by repeating the recording on one-circumference of track->the jumping of ten tracks->the recording on one-circumference of track of the jumped site->the jumping of ten tracks->the recording on one-circumference of track of the jumped site.

In the case where the hologram recording medium HM according to the embodiment is used, if (hologram recording pitch)=(track pitch) is set, the appropriate hologram reproducing may not be performed. Therefore, the hologram recording is performed so that the recording pitch in the radial direction is wider than the track pitch.

Therefore, the target correction amount necessary for implementing the correction of the hologram reproducing position may be obtained by performing, for example, calibration before the reproducing. More specifically, if the position at which the largest hologram reproducing light amount is to be obtained is specified by shaking the reproducing position at the position in the vicinity thereof with reference to the to-be-reproduced track (in this case, the land L), the misalignment amount up to the position becomes the target correction amount.

In addition, in the embodiment, the procedure for fine adjustment for performing the correction of the reproducing position is proposed, but the procedure for correction of the reproducing position is not proposed. In other words, in the embodiment, the procedure for fine adjustment of the reproducing position necessary for implementing the correction of the reproducing position is proposed.

Therefore, in the embodiment, any procedure may be employed as the procedure for obtaining the target correction amount, and the invention is not limited to the aforementioned procedure.

Next, the above description is maintained, and a procedure for fine adjustment of the reproducing position is described in detail with reference to FIGS. 8 to 11.

Figure 8:
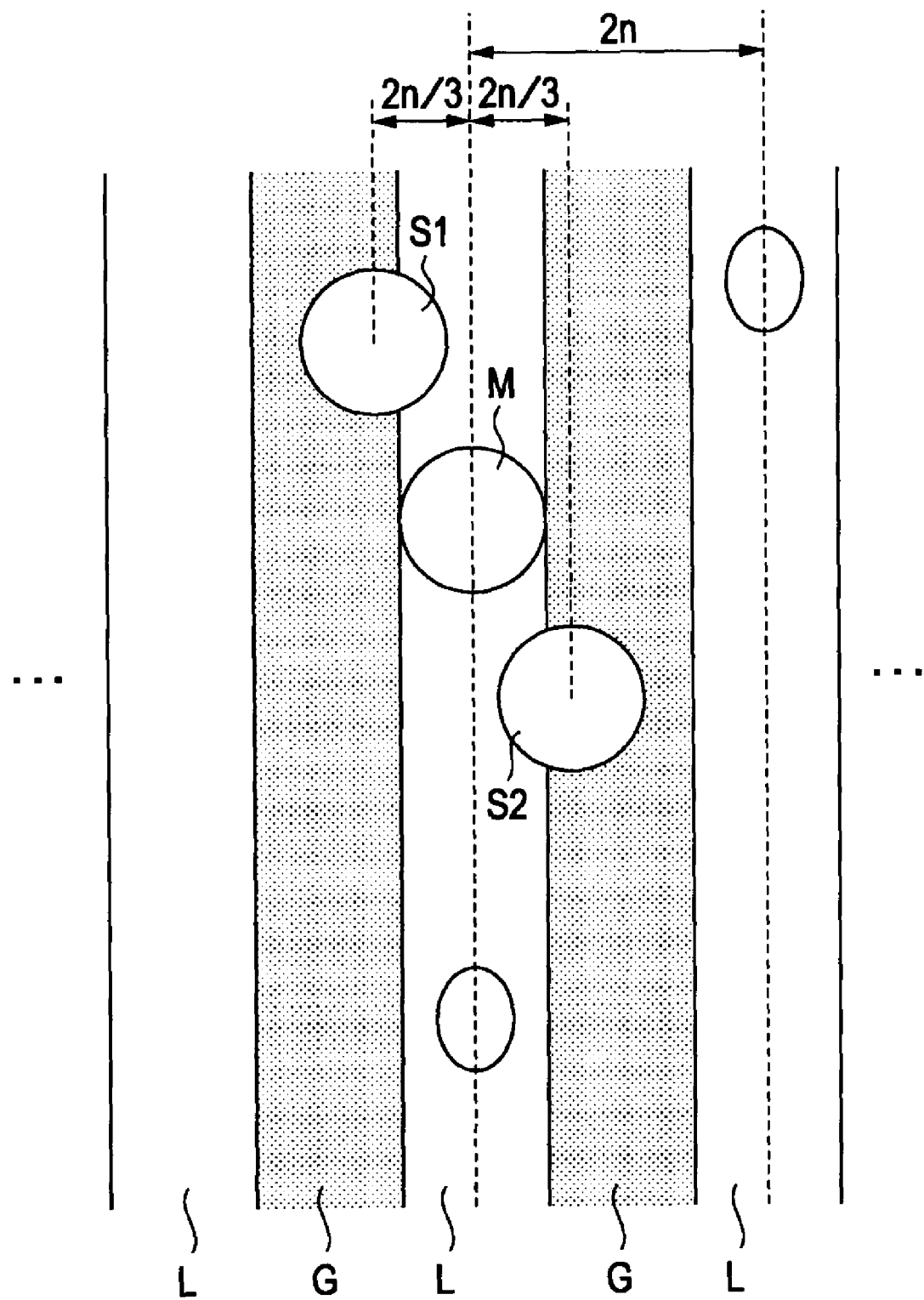
FIG. 8 is a diagram illustrating a relationship between irradiating spot positions of three light beams (a main light beam, a first sub light beam, and a second sub light beam) and lands and grooves formed on the disk-shaped recording medium.

First, FIG. 8 irradiates a relationship of positions of spots irradiated by three light beams (the main light beam, the first sub light beam, and the second sub light beam) described in FIG. 5 and the lands L and grooves G formed on the hologram recording medium HM.

Herein, in the description hereinafter, the spot on the position control information recording layer irradiated by the main light beam is denoted by a main beam spot M. In addition, the spot on the position control information recording layer irradiated by the first sub light beam is denoted by a first sub beam spot S1, and the spot on the position control information recording layer irradiated by the second sub light beam is denoted by a second sub beam spot S2.

As shown in FIG. 8, with respect to the main beam spot M, the first sub beam spot S1, and the second sub beam spot S2, the main beam spot M is disposed at the central portion; the first sub beam spot S1 is disposed at the left side of the main beam spot M; and the second sub beam spot S2 is disposed at the right side of the main beam spot M. In other words, the first sub beam spot S1 and the second sub beam spot S2 are disposed at the positions departing from the main beam spot M in the directions that are different from the radial direction.

In addition, in the embodiment, each of the radial intervals of the three beam spots is set to be a predetermined interval. More specifically, each of the radial intervals of the three beam spots is set to be ⅓ of the track pitch (in this case, the pitch of the formed lands L).

In this case, since the track pitch is 2n, as shown in the figure, each of the radial arrangement intervals of the first sub beam spot S1 and the second sub beam spot S2 with respect to the main beam spot M is "2n/3".

Herein, for the better understanding, in the recording/reproducing apparatus shown in FIG. 5, the optical system is adjusted so as to implement the arrangement interval between the main beam spot M, the first sub beam spot S1, and the second sub beam spot S2.

In the embodiment, with respect to the main beam spot M, the first sub beam spot S1, and the second sub beam spot S2 that are disposed in the aforementioned arrangement interval, the tracking error signals are individually generated at the positions of the spots.

More specifically, the tracking error signal TE-m based on the reflected light from the main beam spot M, the tracking error signal TE-s1 based on the reflected light from the first sub beam spot S1, and the tracking error signal TE-s2 based on the reflected light from the second sub beam spot S2 are generated.

Figure 9A:
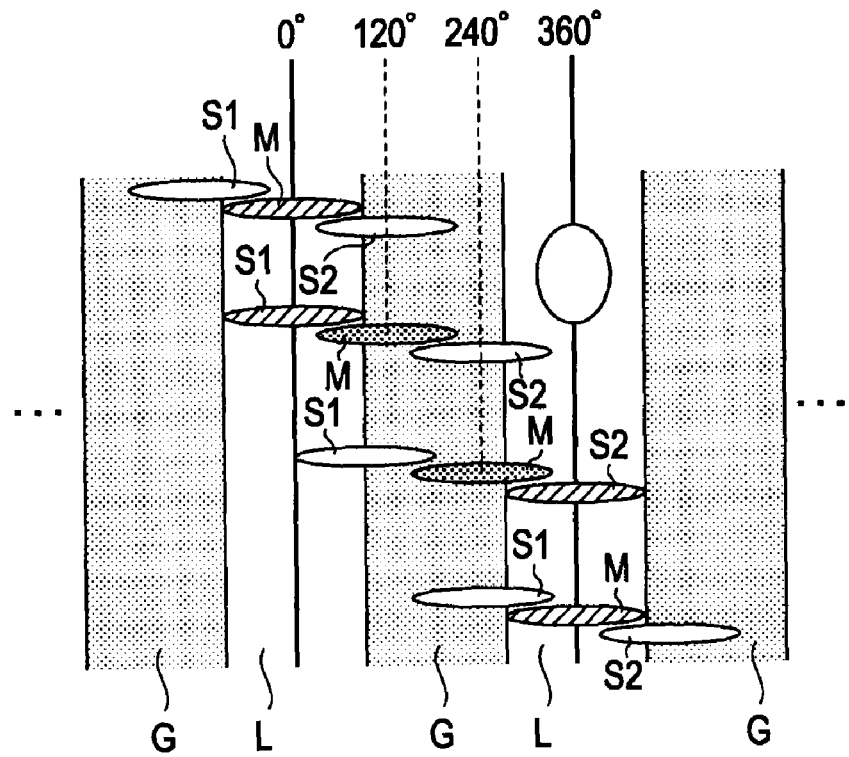
FIGS. 9A and 9B are diagrams illustrating a relationship between a state that a set of the main beam spot, the first sub beam spot, and the second sub beam spot is moved in the radial direction and tracking error signals of the beam spots obtained according to the radial direction movement.
Figure 9B:
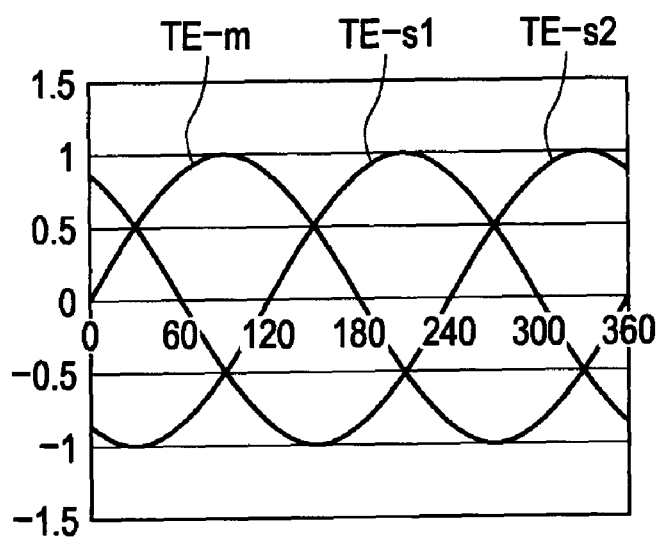

FIG. 9A illustrates a behavior where a set of the main beam spot M, the first sub beam spot S1, and the second sub beam spot S2 is moved on the position control information recording layer in the radial direction according to the driving of the tracking actuator 16A shown in FIG. 5, and FIG. 9B illustrates a relationship among the tracking error signals TE-m, TE-s1, and TE-s2 obtained according to the movement in the radial direction.

In addition, FIG. 9A also illustrates a state, where a set of spots M, S1, and S2 moving in the radial direction is in the moving positions thereof, in one sheet.

In addition, in the figures following FIGS. 9A and 9B, the shapes of the spots M, S1, and S2 are selected as an elliptic shape for simplifying the illustration.

Herein, if the tracking error signal TE generated based on the reflected light of the one spot is considered, the amplitude value of the tracking error signal TE is 0 in the state where the center of the spot is coincident with the center of the land L, so that the amplitude value is changed from the maximum peak value to 0 according to the movement of the spot from the boundary between the land L and the groove G to the center of the groove G. In addition, according to the movement of the spot from the boundary between the groove G and the land L to the center of the land L, the amplitude value is changed from the minimum value to 0.

In other word, in this case, with respect to the tracking error signal TE, one waveform period thereof may be obtained through the one-time crossing between the lands L (the crossing one track).

At this time, if the one waveform period of the tracking error signal TE is represented with a phase of 0° to 360°, the boundary between the land L and the groove G, where the amplitude value of the tracking error signal TE is the maximum peak value, may be defined as the position having a phase of 90°. Similarly, the center of the groove G, where the amplitude value of the tracking error signal TE becomes 0 again, and the boundary between the groove G and the land L, where the amplitude value of the tracking error signal TE is the minimum peak value, may be defined as the position having a phase of 180° and the position having a phase of 270°, respectively.

In this manner, a position between the lands L may be defined as any one of the positions having a phase of 0° to 360°. Hereinafter, the phase of 0° to 360° corresponding to the positions between the lands L (tracks), which may be defined based on the phase of the tracking error signal TE, is referred to as a "track phase". For example, the track phase of 0° (=360°) represents the center of the land L, and the track phase of 180° represents the center of the groove G.

Herein, in the embodiment, the beam spots M, S1, and S2 are separated from each other by ⅓ of track pitch (the pitch of the formed lands L) in the radial direction. In other words, in terms of the track phase, the three beam spots may be defined so that the beam spots are arranged to be shifted by the track phase of 120°.

Therefore, when a combination of the beam spots M, S1, and S2 are moved in the radial direction as shown in FIG. 9A, the phases of the tracking error signals TE-m, TE-s1, and TE-s2 are shifted by 120° as shown in FIG. 9B.

More specifically, In FIG. 9A, since the combination of the beam spots M, S1, and S2 are moved in the rightward direction in the figure, the tracking error signal TE-s1 of the first sub beam spot S1 which is disposed at the left of the main beam spot M, has a phase of 120° lagging behind the phase of the tracking error signal TE-m. In addition, the tracking error signal TE-s2 of the second sub beam spot S2 which is disposed at the right of the main beam spot M, has a phase of 120° preceding the phase of the tracking error signal TE-m.

In addition, since the beam spots M, S1, and S2 are configured so that the phases thereof are shifted by the track phase of 120°, the following functions may be obtained.

Herein, FIG. 9A illustrates the states where the centers of the main beam spot M are located at the positions of the track phases of 0°, 120°, 240°, and 360° according to the movement in the radial direction. Since the beam spots M, S1, and S2 are arranged so as to be shifted by the track phase of 120°, in the state where the main beam spot M is located at the position of the track phase of 120° (that is, the position of ⅓ of the track pitch), the center of the first sub beam spot S1 is coincident with the position of the track phase of 0°, that is, the center of the land L. In addition, in the state where the main beam spot M is located at the position of the track phase of 240° (that is, the position of ⅔ of the track pitch), the center of the second sub beam spot S2 is coincident with the position of the track phase of 360° (=0°), that is, the center of the land L.

As understood from this relationship, in the embodiment, the tracking servo is applied based on the tracking error signal TE-s1 generated from the reflected light of the first sub beam spot S1 so that the center of the first sub beam spot S1 is coincident with the center of the land L, so that the state where the position of the main beam spot M traces the position of the track phase 120° may be obtained.

Similarly, the tracking servo is applied based on the tracking error signal TE-s2 generated from the reflected light of the second sub beam spot S2 so that the center of the second sub beam spot S2 is coincident with the center of the land L, so that the state where the position of the main beam spot M traces the position of the track phase 240° may be obtained.

In addition, if the tracking servo is performed based on the tracking error signal TE-m generated from the reflected light of the main beam spot M, the center of the main beam spot M may trace the center of the land L.

As a result, by employing the procedure of generating the three types of the tracking error signals TE-m, TE-s1, and TE-s2 from the reflected light beams of the three beam spots M, S1, and S2, selecting one tracking error signal TE among the tracking error signals TE, and applying the tracking servo based on the selected tracking error signal TE, the trace position of the main beam spot M may be selected as an arbitrary position among the positions that divides the track pitch into three portions. In other words, accordingly, a finer adjustment width than the width exceeding the optical limit of the related art may be implemented.

Herein, for example, in the calibration for obtaining the target correction amount, the reproducing position (specified by the number of tracks and the phase of track) at which the largest reproducing light amount is to be obtained is calculated by shaking the hologram reproducing position which is to be selected through the selection of the tracking error signal TE with reference to the to-be-reproduced track. Next, the number of tracks between the to-be-reproduced track and the obtained position and the misalignment amount in the track phase are employed as the target correction amount.

In other words, since the to-be-selected tracking error signal TE is determined according to the information of the target correction amount, if the tracking servo is performed based on the tracking error signal TE, the adjustment (correction) of the hologram reproducing position may be automatically implemented with the adjustment width finer than the accuracy exceeding the track pitch.

Generation of Total of Six Types of Tracking Error Signals Including Inverted Signals The selection of the aforementioned three types of the tracking error signals TE-m, TE-s1, and TE-s2 is basically used for the selection of the reproducing position. In addition, in the embodiment, as shown later in FIG. 10, the inverted signals of the three types of the tracking error signals TE-m, TE-s1, and TE-s2 are generated. Therefore, a total of six types of the tracking error signals TE are obtained. Next, one tracking error signal TE is selected among the six types of the tracking error signals TE, and the tracking servo is performed. As a result, the selection of the reproducing position may be performed by using the positions so that the track pitch is divided into six portions as the to-be-reproduced positions.

Figure 10:
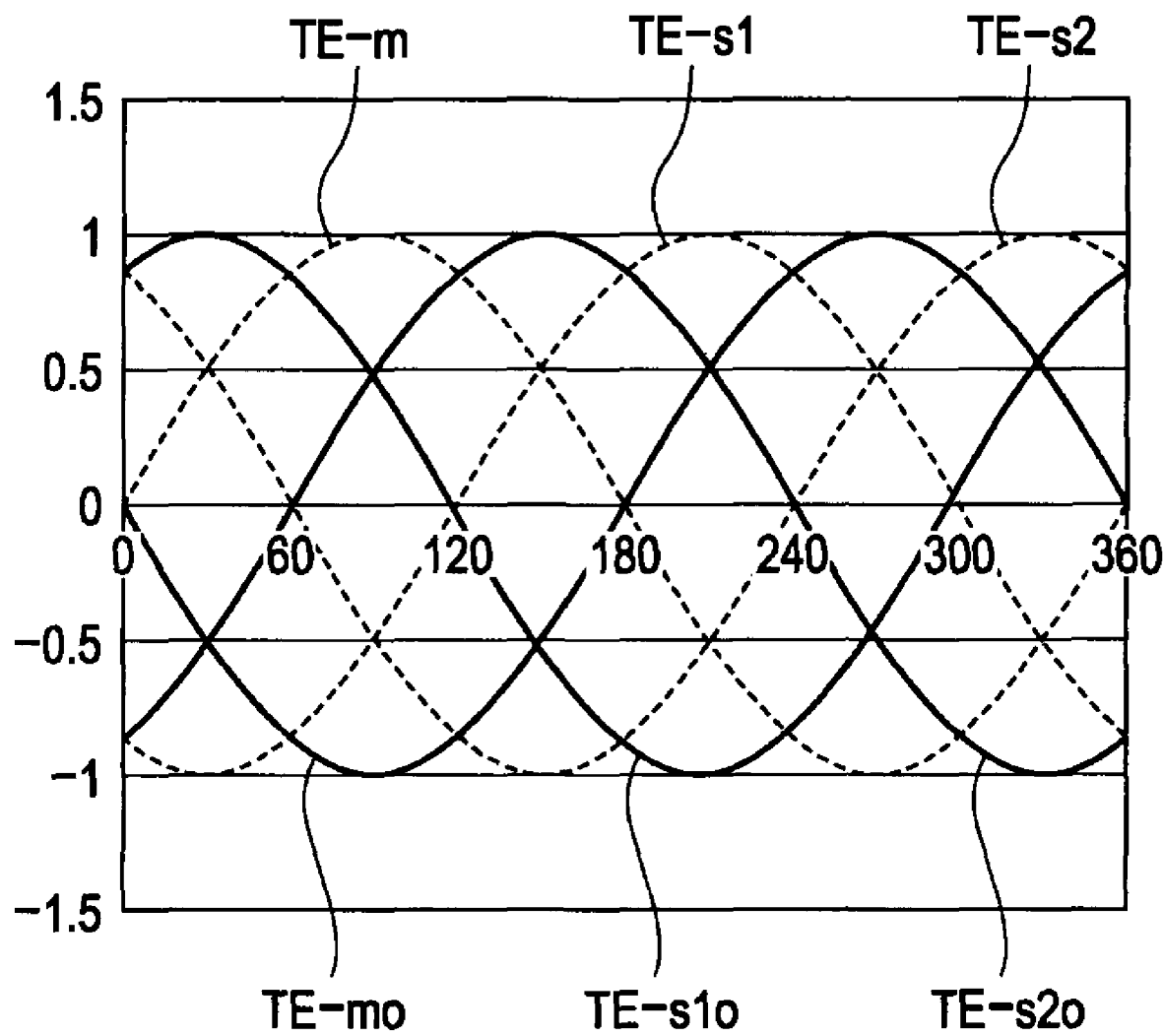
FIG. 10 is a diagram illustrating a total of six types of tracking error signals including an inverted signal.

As shown in FIG. 10, the inverted signal of the tracking error signal TE-m is denoted by a tracking error signal TE-mo. In addition, the inverted signal of the tracking error signal TE-s1 is denoted by a tracking error signal TE-s1o, and the inverted signal of the tracking error signal TE-s2 is denoted by a tracking error signal TE-s2o.

Herein, the inverted signals have an inverted-phase relationship with the original signals. In other words, the phase difference from the original signal is 180°.

As understood from this, if the tracking servo is performed based on the tracking error signal TE-mo, the position of the main beam spot M is set to a position shifted by the track phase 180° from the track phase 0° of the case where the tracking servo is performed based on the original signal, that is, the tracking error signal TE-m.

In addition, if the tracking servo is performed based on the tracking error signal TE-s1o, the position of the main beam spot M is set to a position of the track phase 300° shifted by 180° from the track phase 120° of the case where the tracking servo is performed based on the original signal, that is, the tracking error signal TE-s1.

Similarly, if the tracking servo is performed based on the tracking error signal TE-s2o, the position of the main beam spot M is set to a position of the track phase 60° shifted by 180° from the track phase 240° of the case where the tracking servo is performed based on the original signal, that is, the tracking error signal TE-s2.

Figure 11:
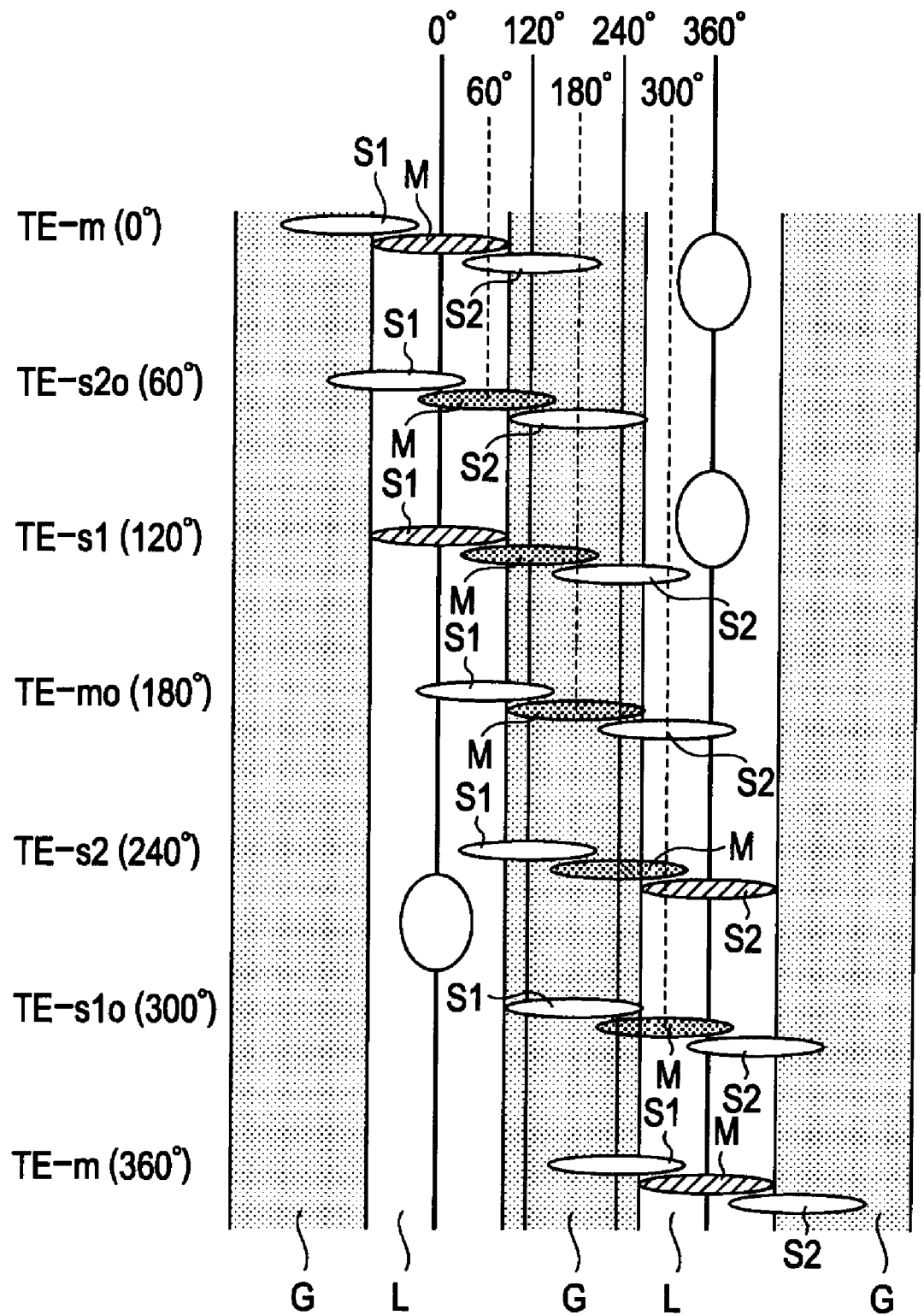
FIG. 11 is a diagram illustrating spot positions corresponding to six types of tracking error signals selected.

FIG. 11 illustrates the positions of the spots in the cases where the aforementioned six types of tracking error signals TE are selected.

As shown in FIG. 11, by selecting one tracking error signal TE among the six types of the tracking error signals TE and performing the tracking servo, the position of the main beam spot M may be selected among the six positions of the track phases of 0° (360°), 60°, 120°, 180°, 240°, and 300°.

More specifically, the position of the track phase of 0° (360°) may be selected through the selection of the tracking error signal TE-m; the position of the track phase of 60° may be selected through the selection of the tracking error signal TE-s2o; the position of the track phase of 120° may be selected through the selection of the tracking error signal TE-s1; the position of the track phase of 180° may be selected through the selection of the tracking error signal TE-mo; the position of the track phase of 240° may be selected through the selection of the tracking error signal TE-s2; and the position of the track phase of 300° may be selected through the selection of the tracking error signal TE-s1o.

Selection of Spots Using Address Information Reading

Figure 12:
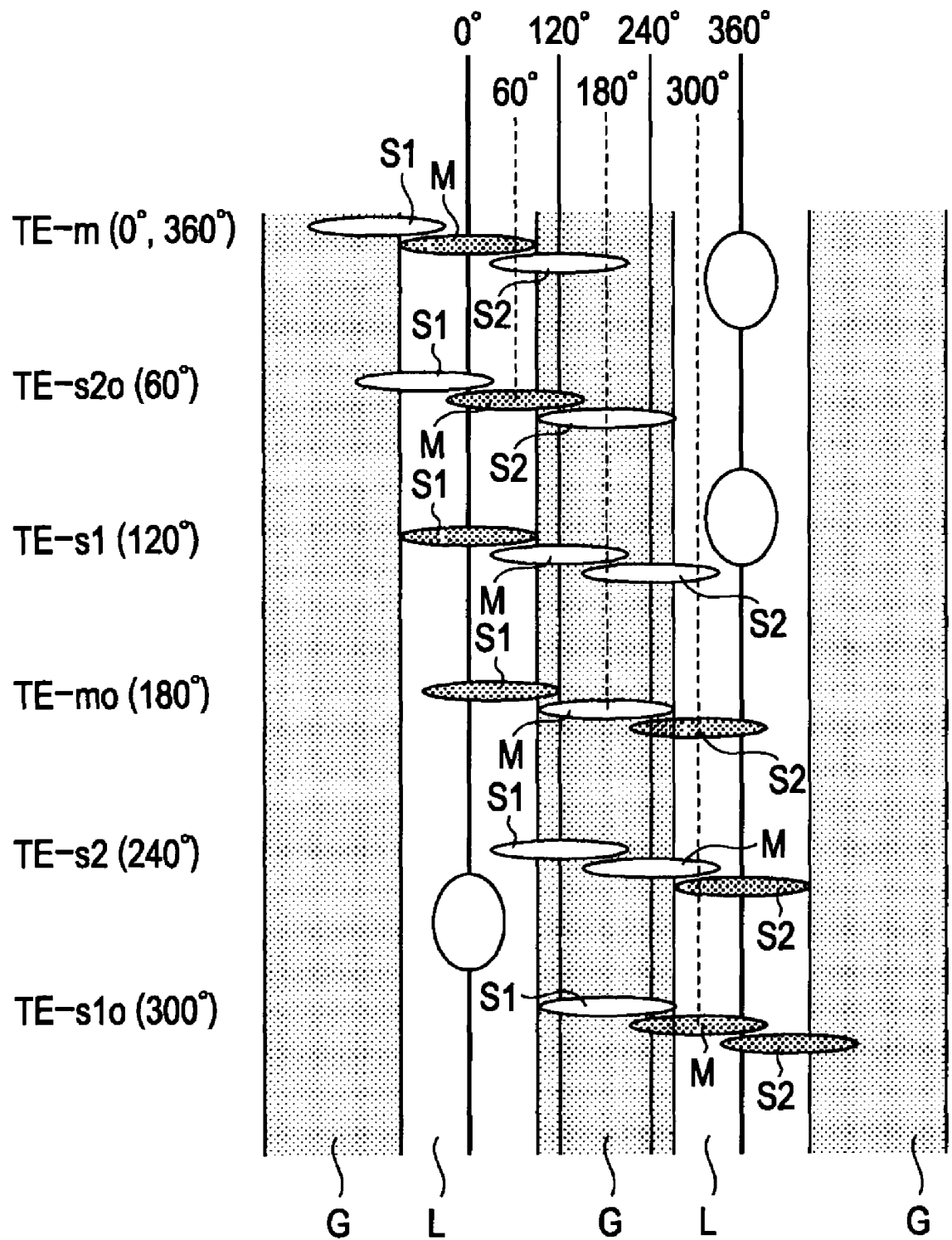
FIG. 12 is a diagram illustrating a relationship between selected tracking error signals and spots used for address reading.

Herein, in the case where the trace position is selected as shown in FIG. 12, a positional relationship between the beam spots and the pit-formed lands L is changed according to the selected trace position.

Therefore, in order to read the address information recorded on the lands L, the spots used for address reading may have to be selected according to the selected trace positions (error signals TE).

FIG. 12 illustrates a relationship between the selected tracking error signals TE and the spots used for the address reading.

In FIG. 12, the relationship between the six types of the tracking error signals TE and the tracks of the spots (M, S1, and S2) at the time when the tracking servo is performed based on the selected tracking error signal TE is illustrated, and the spots to be used for the address information reading are illustrated by color-added spots in the figure.

As shown in FIG. 12, the relationship between the "selected tracking error signal TE" and the "spots to be used for the address information reading" is determined in advance.

In the recording/reproducing apparatus according to the embodiment, the address information reading (and the clock generation) using the reflected light signal of the spot corresponding to the tracking error signal TE selected among the aforementioned target correction amount is performed based on the information of the predetermined relationship.

Herein, as understood with reference to FIG. 12, according to the selected tracking error signal TE, two spots to be used for the address reading may exist. In the case of selecting the tracking error signal TE corresponding to the case where the two or more spots to be used for the address reading are set, the signal having the good signal quality among the reflected light signals of the two spots is used for the address reading (and the clock generation).

2-3. Configuration for Spot Position Control

Next, a configuration for implementing the spot position control (fine adjustment procedure) according to the aforementioned embodiment is described.

Figure 13:
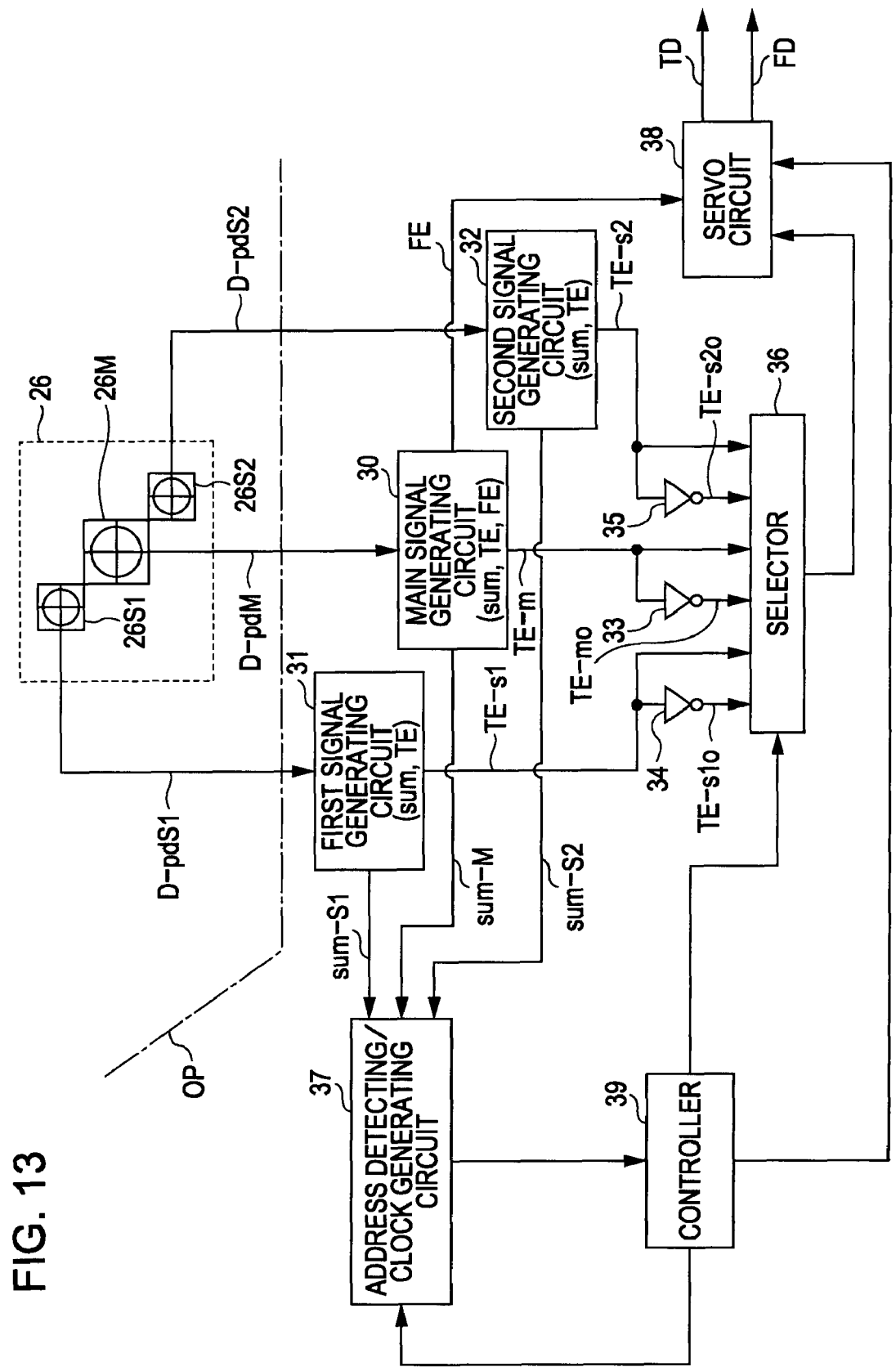
FIG. 13 is a diagram illustrating internal configurations of a recording/reproducing apparatus according to an embodiment (mainly extracting and illustrating only a configuration of a signal processing system for implementing position control).

FIG. 13 mainly illustrates only a configuration of a signal processing system for implementing the spot position control, which is extracted among internal configurations of the recording/reproducing apparatus according to the embodiment.

First, in FIG. 13, although the light receiving unit 26 in the optical pickup OP shown in FIG. 5 is shown, the light receiving unit 26 is provided with a main photodetector 26M, a first sub photodetector 26S1, and a second sub photodetector 26S2. The main photodetector 26M receives a reflected light of the main light beam that irradiates the hologram recording medium HM. In addition, the first sub photodetector 26S1 receives a reflected light of the first sub light beam that irradiates the hologram recording medium HM, and similarly, the second sub photodetector 26S2 receives a reflected light of the second sub light beam that irradiates the hologram recording medium HM.

In the embodiment, each of the main photodetector 26M, the first sub photodetector 26S1, and the second sub photodetector 26S2 is constructed with a 4-dividing detector.

Outside the optical pickup OP, a main signal generation circuit 30, to which the received signal D-pdM is input from the main photodetector 26M, a first signal generation circuit 31, to which the received signal D-pdS1 is input from the first sub photodetector 26S1, and a second signal generation circuit 32, to which the received signal D-pdS2 is input from the second sub photodetector 26S2 are disposed.

In addition, outside the optical pickup OP, an inversion circuit 33, an inversion circuit 34, an inversion circuit 35, a selector 36, an address detecting/clock generation circuit 37, a servo circuit 38, and a controller 39 are disposed.

The main signal generation circuit 30 generates a sum signal, a tracking error signal TE, and a focus error signal FE that are necessary for generating address information and generating a clock based on a received signal from light receiving devices of the main photodetector 26M as a received signal D-pdM.

More specifically, the sum signal becomes a sum signal of the received signals of the light receiving devices. In addition, a Push Pull signal is generated as the tracking error signal TE.

As understood from the above description, the tracking error signal TE generated by the main signal generation circuit 30 becomes a tracking error signal TE-m. As shown, the tracking error signal TE-m is applied to a selector 36 and an inversion circuit 33.

In addition, the sum signal generated by the main signal generation circuit 30 is referred to as a sum-M signal. The sum-M signal is applied to an address detecting/clock generation circuit 37.

In addition, the focus error signal FE is applied to the servo circuit 38.

The first signal generation circuit 31 generates the sum signal and the tracking error signal TE based on the received signals from the light receiving devices of the first photodetector 26S1 as the received signal D-pdS1.

The tracking error signal TE generated by the first signal generation circuit 31 becomes the aforementioned tracking error signal TE-s1. As shown, the tracking error signal TE-s1 is applied to the selector 36 and the inversion circuit 34.

In addition, the sum signal generated by the first signal generation circuit 31 is referred to as a sum-S1 signal. The sum-S1 signal is applied to the address detecting/clock generation circuit 37.

The second signal generation circuit 32 generates the sum signal and the tracking error signal TE based on the received signals of the light receiving devices of the second photodetector 26S2 as the received signals D-pdS2.

The tracking error signal TE generated by the second signal generation circuit 32 becomes the aforementioned tracking error signal TE-s2. The tracking error signal TE-s2 is applied to the selector 36 and the inversion circuit 35.

In addition, the sum signal generated by the second signal generation circuit 32 is referred to as a sum-S2 signal. The sum-S2 signal is applied to the address detecting/clock generation circuit 37.

Each of the inversion circuits 33, 34, and 35 inverts the polarity of the applied tracking error signals TE-m, TE-s1, and TE-s2 to apply the inverted signal to the selector 36. Therefore, six types of tracking error signals TE, that is, the tracking error signals TE-m, TE-mo, TE-s1, TE-s1o, TE-s2, and TE-s2o are applied to the selector 36.

The selector 36 selects and outputs one tracking error signal TE instructed by the controller 39 among the six types of the tracking error signals TE. The tracking error signal TE selected by and output from the selector 36 is applied to the servo circuit 38.

The servo circuit 38 performs a servo operation based on the tracking error signals TE selected and output by the selector 36 to generate the tracking servo signal and applies a tracking drive signal TD generated based on the tracking servo signal to the tracking actuator 16A (refer to FIG. 5) in the optical pickup OP.

The driving of the tracking actuator 16A is controlled based on the tracking drive signal TD, so that main beam spot M is allowed to trace any one of the six divided positions of the track pitch as shown above in FIG. 12.

In addition, in response to the track jump instruction from the controller 39, the servo circuit 38 turns off the tracking servo loop to output a jump pulse as the tracking drive signal TD, so that a jumping operation between the tracks (in this case, between the lands L) is performed.

In addition, the servo circuit 38 performs the servo operation based on the focus error signal FE applied from the aforementioned main signal generation circuit 30 to generate the focus servo signal. Therefore, the servo circuit 38 performs the focus servo control by applying the focus drive signal FD to the focus actuator 16B in the optical pickup OP.

In addition, although omitted in the figure, as described above, in an actual case, a thread mechanism for moving the entirety of the optical pickup OP in the tracking direction is provided, and the servo circuit 38 controls the driving of the thread mechanism based on a thread error signal generated based on the tracking error signal TE or the seeking operation control of the controller 39, so that the entirety of the optical pickup OP is moved in the tracking direction.

The address detecting/clock generation circuit 37 detects (reads) address information recorded on a position control information recording layer of the hologram recording medium HM and generates clocks based on the sum-m signal, the sum-S1 signal, and the sum-S2 signal.

One sum signal according to a command from the controller 39 is selected among the sum-m signal, the sum-S1 signal, and the sum-S2 signal, and the address information detection and the clock generation are performed based on the selected sum signal.

Herein, as described above with reference to FIG. 4, in the case of the embodiment, 1-channel bit information representing the pit existence at the pit formable position set in a predetermined interval on the land L is recorded as the address information. Accordingly, the address detecting/clock generation circuit 37 perform the data identification for "0" and "1" of the 1-channel bit in the selected sum signal by performing the pit existence identification (H/L identification) at the pit formable position in the predetermined interval. Next, the address detecting/clock generation circuit 37 detects (reads) the recorded address information by performing an address decoding process according to the format described above with reference to FIG. 4 based on the result thereof. The address information obtained by the address detecting/clock generation circuit 37 is applied to the controller 39.

In addition, the clock is generated by performing a PLL process using the selected one of the sum signals as an input signal (reference signal). Although not shown, the clocks generated by the address detecting/clock generation circuit 37 are applied as operating clocks to the necessary components.

The controller 39 is configured as a microcomputer including, for example, a CPU (central processing unit), a ROM (read only memory), a RAM (random access memory), and the like. The controller 39 controls the entirety of the recording/reproducing apparatus by performing calculation processes and control processes based on programs stored in, for example, the ROM and the like.

For example, the controller 39 performs hologram recording/reproducing position control by controlling the selector 36 and the servo circuit 38.

More specifically, at the hologram recording time, a recording control process for optimizing the hologram recording pitch in the radial direction is performed as described above. More specifically, for example, as described above, the control for repeating the recording on one-circumference of track->the jumping of ten tracks->the recording on one-circumference of track of the jumped site->the jumping of ten tracks->the recording on one-circumference of track of the jumped site is performed.

In addition, a target position is designated according to the state where data is to be recorded or reproduced with respect to the hologram recording medium HM, and seeking operation control is performed.

Herein, the designated "target position" is a position in the radial direction, which reflects a "target correction amount" obtained by calibration that is performed in advance. In other words, although the position of the main beam spot M is allowed to be coincident with the to-be-reproduced address (that is, the data-recorded address: land L), since the actual reproducing position (position of the recording/reproducing light) may be misaligned from the actual recording position as shown above in FIG. 7A, the position that is offset from the to-be-reproduced address by the target correction amount obtained in advance by the calibration is set to the "target position". By performing the seeking operation control on the set "target position", the misalignment between the actual recording position and reproducing position may be corrected.

After the "target position" is designated, the seeking operation control is performed, for example, in the following procedure.

1) Movement to the vicinity of the target position by the movement of the entirety of the optical pickup OP
2) Focus Servo ON
3) Leading the tracking servo by using the tracking error signal TE-m of the main beam spot M
4) The address (radial position) may be read by applying the tracking servo in 3), so that the track jumping and the re-selection of the tracking error signal TE are performed according to an error between the address and the "target position".

The controller 39 instructs the servo circuit 38 so that the operations 1) and 2) are performed. In addition, in order to implement the operation 3), the controller 39 instructs the selector 36 to select the tracking error signal TE-m and instructs the servo circuit 38 to star leading the tracking servo.

In addition, in order to implement the operation 4), the controller 39 inputs the address information that is detected by the address detecting/clock generation circuit 37 according to the application of the tracking servo in the operation 3), calculates the number of jump tracks necessary for jumping to the "target position" based on the address information, and instructs the servo circuit 38 to perform the track jumping operation by the calculated the number of jump tracks. In addition, in this case, since the leading of the tracking servo is performed so that the main beam spot M is coincident with the position of the track phase 0° (the center of the land L) by using the tracking error signal TE-m, the controller 39 instructs the selector 36 to select the tracking error signal TE corresponding to the "target position". In other words, as understood from the above description, since the "target position" is information representing the number of misaligned tracks and the amount of misaligned track phase (that is, a difference of the to-be-selected tracking error signal TE) with reference to the to-be-reproduced track (the center of the land L), after the track jumping is performed, the selection of the tracking error signal TE according to the "target position" is also instructed.

In addition, for the better understanding, the number of jump tracks necessary for jumping from the address-read position to the "target position" may be "0". In addition, the track phase of the "target position" may be 0° (at the center of the land L). Therefore, in the operation 4), the track jumping or the re-selection of the tracking error signal TE may be performed if necessary.

In addition, in the case of the embodiment, the hologram recording is not performed along the circumference of each track, but as described above, the recording is performed along a plurality of circumferences in order to implement an appropriate pitch.

In other words, accordingly, the controller 39 performs the seeking operation control on the "target position", and after that, controls the position of the spot to be moved by using the same method as the recording time. More specifically, in the case where the recording procedure for performing the track jumping at every completion of one-circumference recording is employed, the controller 39 controls the servo circuit 38 to perform the track jumping at predetermined times every completion of the one-circumference reproducing.

In addition, the controller 39 also instructs the address detecting/clock generation circuit 37 to select the sum signal corresponding to the tracking error signal TE selected by the selector 36. The controller 39 instructs the address detecting/clock generation circuit 37 to select the sum signal corresponding to the tracking error signal TE selected by the selector 36 based on the information representing the predetermined relationship between the tracking error signal TE described above with reference to FIG. 13 and the to-be-used spot (any one of sum-m, sum-S1, and sum-S2).

In addition, as described above, according to the selected tracking error signal TE, two spots (sum signals) to be used may exit. Therefore, in this case, the controller 39 instructs the address detecting/clock generation circuit 37 to select the two sum signals.

In the case where the address detection/clock generation circuit 37 is instructed to select the two sum signals, the signal having a good signal quality is selected among the signals. More specifically, the address detecting/clock generation circuit 37 monitors the two sum signals instructed to select the one sum signal having the good signal quality.

3. Statistics of Embodiments

In the embodiment described above, the following conditions are given.

1) A hologram recording medium HM where grooves G and lands L are alternately formed with an equal width in a radial direction is used.
2) A radial interval of beam spots of three-divided light beams of a position control laser light is set to be ⅓ of a track pitch (in this case, a pitch of the formed lands L) of the hologram recording medium HM.
3) The three-divided light beams are individually received, so that tracking error signals TE corresponding to the beams are generated.
4) One error signal TE is selected among the generated error signals TE based on information of a determined correction amount, and tracking servo is applied based on the selected error signal TE.

In the case where the conditions 1) and 2) are satisfied, if the tracking servo is performed by using the tracking error signal TE-s1 generated from a received signal of the first sub light beam among the sub light beams, the center of the main beam spot M is configured to trace the position which is shifted by ⅓ of the track pitch from the center of the spot S1 of the first sub light beam tracing the track. On the other hand, if the tracking servo is performed by using the tracking error signal TE-s2 generated from a received signal of the second sub light beam, the center of the main beam spot M is configured to trace the position which is shifted by ⅓ of the track pitch from the center of the spot S2 of the second sub light beam tracing the track. In addition, if the tracking servo is performed by using the tracking error signal TE-m generated from a received signal of the main light beam, the center of the main beam spot M is configured to trace the center of the track.

In this manner, with respect to the tracing positions of the main beam spot M, there may be selected three states, that is, a state where the center of the main beam spot M traces the center of the track, a state where the center thereof traces the position which is shifted by ⅓ of the track pitch from the center of the track in the one direction, and a state where the center thereof traces the position which is shifted by ⅓ of the track pitch from the center of the track in the other direction. In other words, by selecting the tracking error signal used for the tracking servo, the trace position of the main beam spot M can be selected with a fine width of ⅓ of the track pitch.

In addition, in the embodiment, the tracking error signals TE-m, TE-s1, and TE-s2 are generated from the reflected light beams at the beam spots M, S1, and S2, and the tracking error signals TE-mo, TE-s1o, and TE-s2o are also generated as inverted signals (inverse-phase signals) thereof, so that a total of six types of tracking error signals TE are generated. Next, by selecting one tracking error signal among the six types of tracking error signals TE, the trace position of the main beam spots M can be selected with a fine width of ⅙ of the track pitch.

According to the embodiment, the trace position of the hologram recording/reproducing light can be controlled in a fine unit that exceeds the optical limit such as ⅓ or ⅙ of the track pitch in the related art.

In addition, according to the embodiment, the adjustment of the trace position of the hologram recording/reproducing light can be performed by the tracking servo based on the position control light. In other words, as an adjusting mechanism for adjusting the trace position of the hologram recording/reproducing light, the tracking control mechanism (in this case, the tracking actuator 16A shown in FIG. 5) that is provided so as to implement the tracking servo may be used. Therefore, an axial position adjusting mechanism may not be separately provided to the hologram recording/reproducing light side unlike the related art. In other words, therefore, the production cost for the apparatus can be reduced in comparison with the case in the related art.

In addition, in the embodiment, when the wavelength of the position control light is set to λ, the depth of pit and the depth of groove G may be set to λ/4 and λ/8. However, as a result, the amplitude of the tracking error signal TE can be increased, and the signal quality can be improved.

In other words, as a result, more stabilized tracking servo can be implemented.

In addition, in the embodiment, after the positions in the predetermined interval in the track formation direction (circumferential direction) are set to the pit formable positions, the address information is recorded in the pit existence pattern at the pit formable positions. Therefore, for example, in comparison with the case where the information is recorded by combining the lengths of pits and spaces, short pits may be formed so as to be distributed. As a result, the noise component generated in the tracking error signal TE at the time of passing the pits may be greatly reduced. In other words, accordingly, the quality of the tracking error signal TE may be improved, so that the tracking servo may be stabilized.

4. Modified Example

Although the invention is described with reference to the embodiments hereinbefore, the invention is not limited to the aforementioned embodiment.

For example, the invention may be configured as a modified example shown in FIG. 14 as follows.

Figure 14:
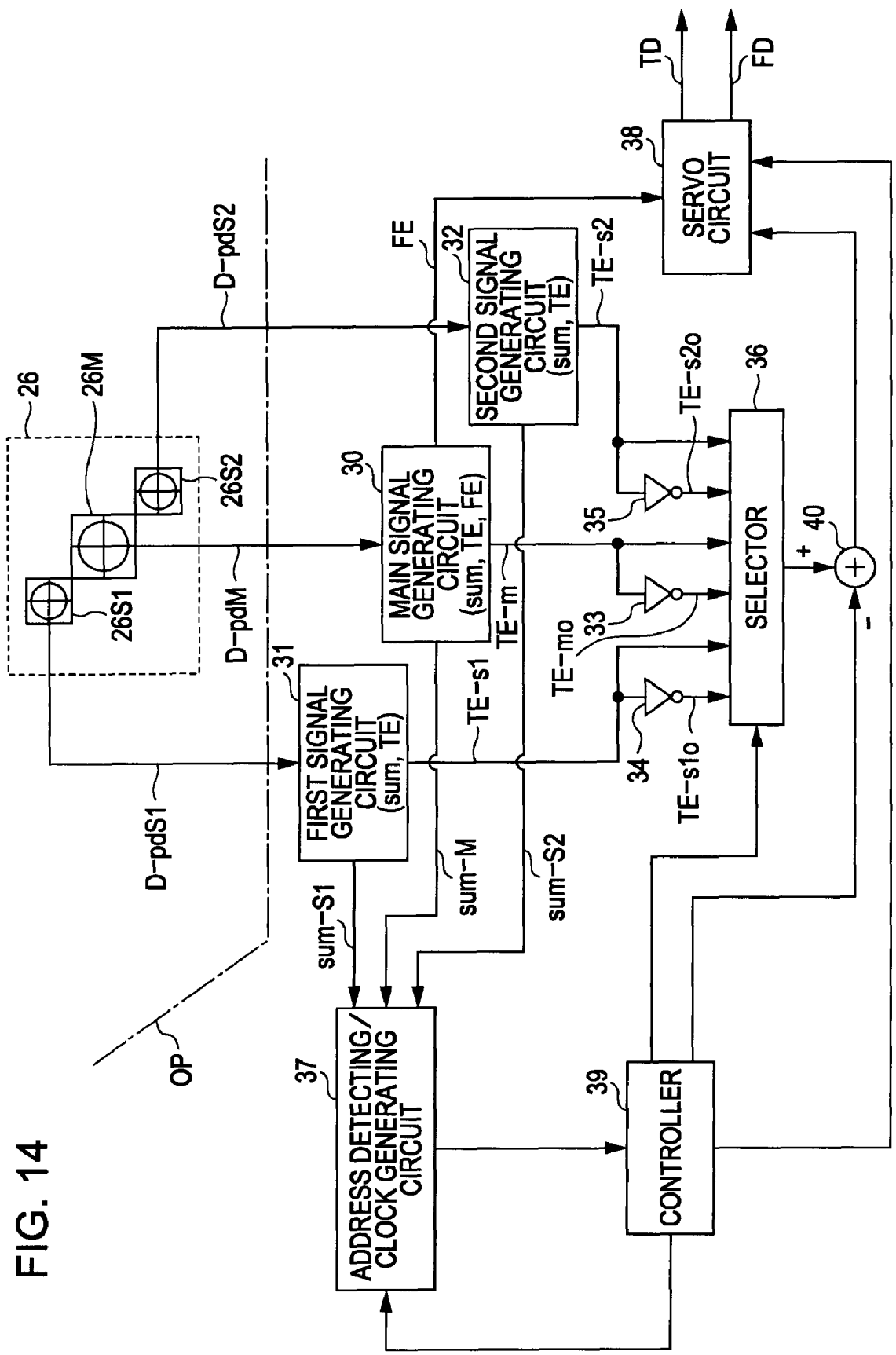
FIG. 14 is a diagram illustrating internal configurations of a recording/reproducing apparatus according to a modified example (mainly extracting and illustrating only a configuration of a signal processing system for implementing position control).

FIG. 14 mainly illustrates only a configuration of a signal processing system for implementing the position control, which is extracted among internal configurations of a recording/reproducing apparatus according to a modified example.

In addition, since the configurations of the hologram recording/reproducing system and the position control optical system among the configurations of the recording/reproducing apparatus according to the modified example are the same as those described in the above embodiment (FIG. 5), the description thereof is omitted.

In addition, in FIG. 14, the same elements as the aforementioned elements described in FIG. 13 are denoted by the same reference numerals, and the description thereof is omitted.

The recording/reproducing apparatus according to the modified example can perform the position control in a finer unit than the width of ⅙ of the track pitch.

As shown in FIG. 14, the recording/reproducing apparatus according to the modified example is different from the recording/reproducing apparatus shown in FIG. 13 in that the tracking error signal TE selected and output by the selector 36 is applied to the servo circuit 38 through an adder 40.

The adder 40 is provided so as to add a necessary offset to the tracking error signal TE. In this case, the offset value that the adder 40 adds to the tracking error signal TE is instructed by the controller 39. In addition, in this case, since the offset is added to the tracking error signal TE, the adder 40 is input with offset value having a negative polarity. In other words, the adder 40 functions as a subtractor.

In this case, the controller 39 allocates to the adder 40 an offset value that is determined so that the moving amount of the main beam spot M (moving amount of the hologram reproducing position) does not exceed a width of ⅙ of the track pitch. Therefore, the reproducing position adjustment may be performed with an accuracy finer than a width of ⅙ of the track pitch.

Herein, in the case where the adjustment is performed with an accuracy finer than ⅙ of the track pitch, the "target correction amount" obtained in the calibration performed for the reproducing may be set in unit finer than a width of ⅙ of the track pitch. More specifically, in this case, in the calibration, the hologram reproducing position is moved with a width of ⅙ of the track pitch through the selection of the tracking error signal TE, and the hologram reproducing light amount is detected at the position moved according to the offset value from the state of the position (track phase) of ⅙ thereof. In other words, in this case, the "target correction amount" is information representing the number of track misalignments from the to-be-reproduced address (centers of lands L), the selected tracking error signal TE, and a combination to the offset value.

Accordingly, the controller 39 calculates the target address (land L), the tracking error signal TE to be selected, and the "target position" represented by the offset value from the "target correction amount" obtained in the calibration, and after that, performs the aforementioned seeking operation control and the allocation of the offset value to the adder 40 so that the main beam spot M is located at the "target position".

Therefore, the reproducing position adjustment may be performed with an accuracy finer than that of the case of exceeding the width of ⅙ of the track pitch, so that the correction of the misalignment between the actual recording position and reproducing position may be performed with a higher accuracy.

In addition, herein, in the case where the offset is allocated to the tracking error signal TE is exemplified, the offset may be allocated to the tracking servo loop. For example, the offset may be allocated to a tracking drive signal TD.

In this case, the polarity of the offset allocated to the tracking drive signal TD may be set to be different from that in the case where the offset is allocated to the tracking error signal TE.

In addition, in the description hereinbefore, the case where the address information recording is performed on the lands L is exemplified, the address information recording may be performed on the grooves G.

In addition, in the description hereinbefore, the focus servo is performed by using the focus error signal FE generated from the reflected light of the central main light beam. However, for example, in the case where a more accurate focus servo is performed, an offset may be allocated to the focus servo loop according to the positions dividing the tracks.

In other words, in the case where the focus servo is performed by using the focus error signal FE corresponding to the central main light beam, an error between an actual focus point and an ideal focus point may occur at positions other than the positions of the track centers (track phase 0°). Therefore, in this case, for example, with respect to the positions other than the positions of the track centers, an offset predetermined according to the positions may be allocated to the focus servo loop.

Figure 15:
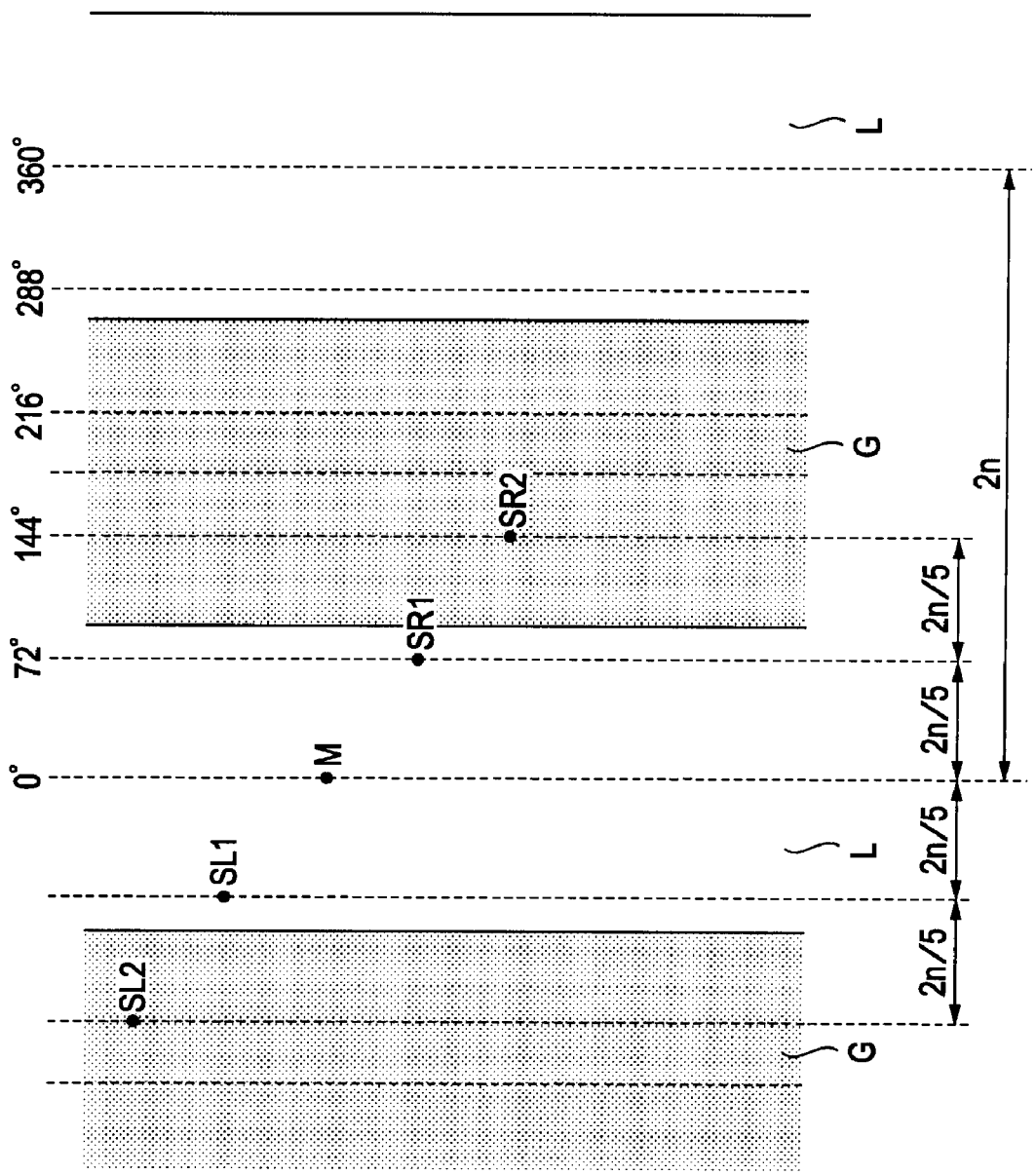
FIG. 15 is a diagram illustrating a modified example where five spots are used.

In addition, in the above description, the number of beam spots used for the position control is exemplarily set to three. However, for example, five beam spots may be used as shown later in FIG. 15.

More specifically, in this case, the 0-th order light beam (main beam spot) and the first order light beams (side beam spots) obtained by the grating are used, and in addition, the second order light beams may also be used. The five beam spots may be denoted by the beam spots SL2, SL1, M (main), SR1, and SR2 sequentially from the inner circumferential side. In addition, in the figure, the centers (black circles) of the beam spots are shown.

In this case, as shown in the figure, if it is set such that track pitch=2n, an interval between the five beam spots in the radial direction is set to "2n/5".

Figure 16:
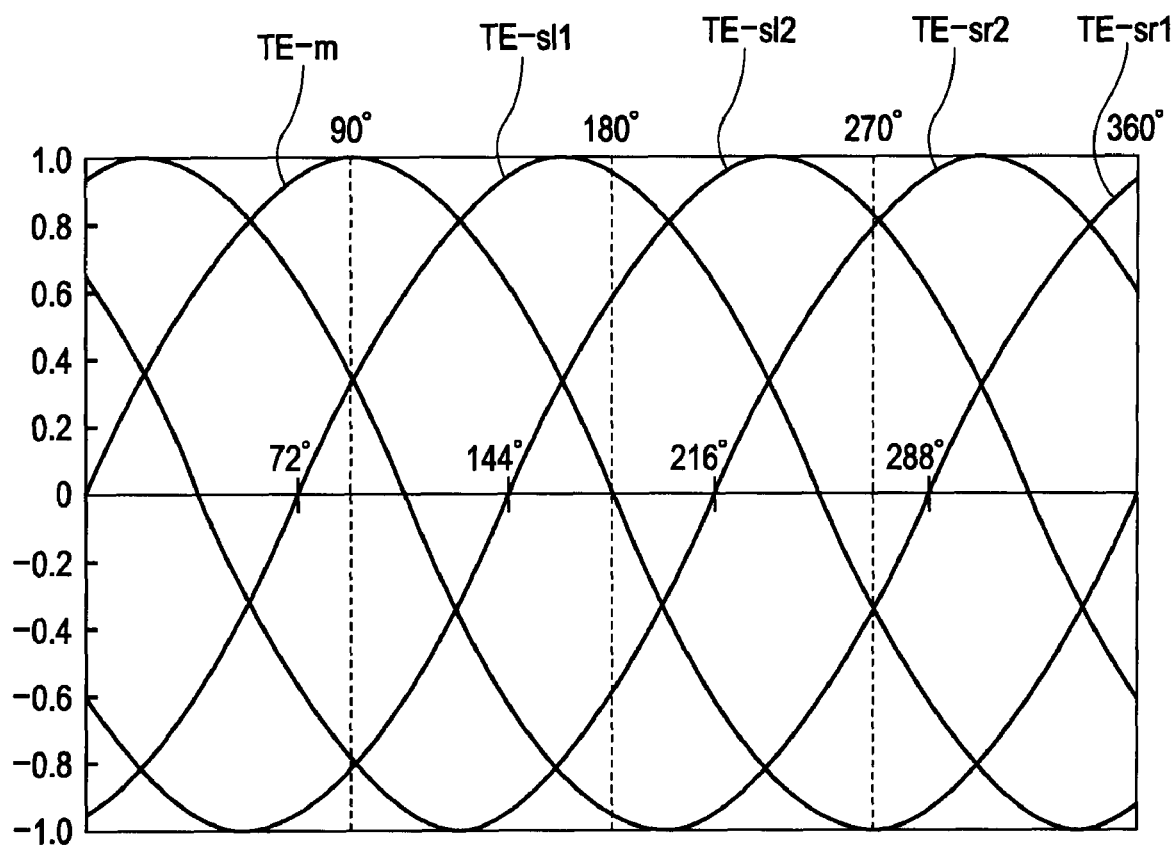
FIG. 16 is a diagram illustrating a waveform of each error signal in the case where five spots are used (at the time of radial direction movement).
Figure 17:
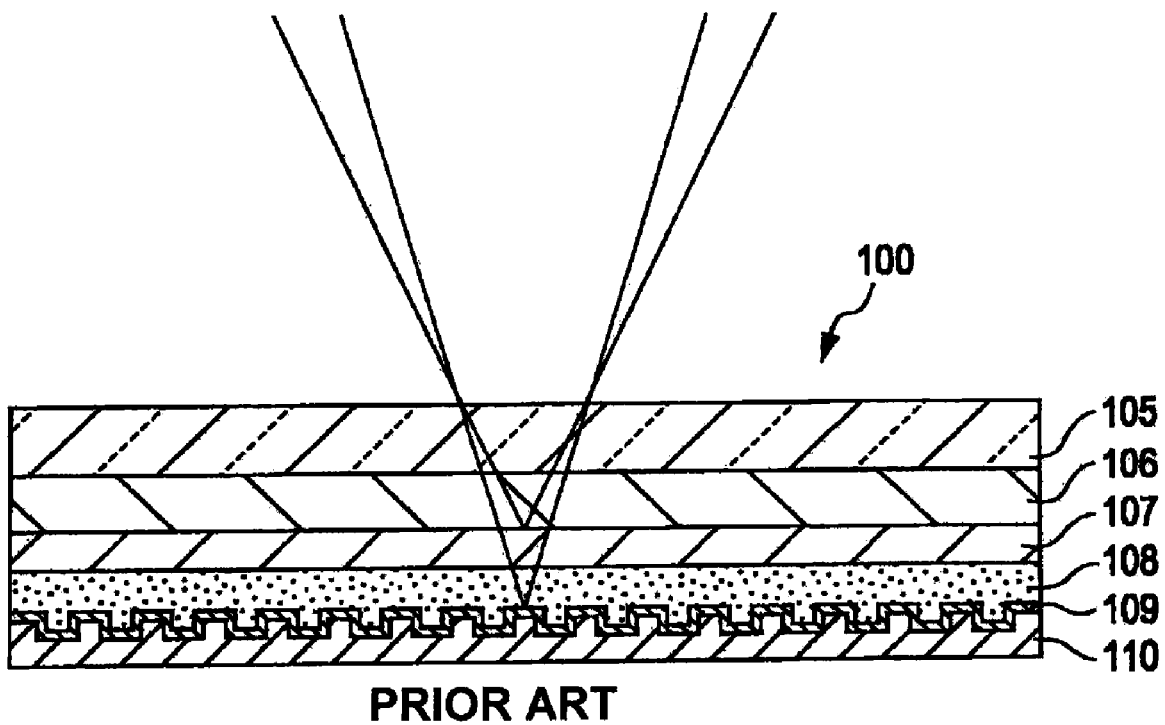
FIG. 17 is a view illustrating a cross-sectional structure of a hologram recording medium in the related art.
Figure 18:
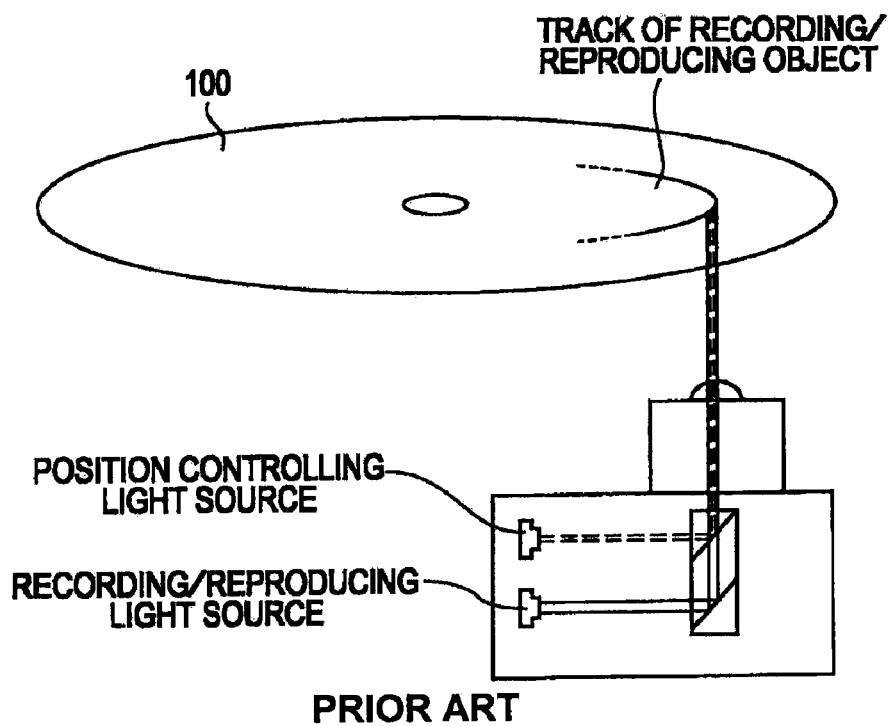
FIG. 18 is a diagram illustrating a relationship between a recording/reproducing light and a position control light that irradiates a hologram recording medium.

In the case where the five spots that are arranged in the interval of 2n/5 are used, the waveforms of the tracking error signals according to the spot movement in the radial direction are shown in FIG. 16. In FIG. 16, the tracking error signals TE-m, TE-sl1, TE-sl2, TE-sr1, and TE-sr2 are generated by individually receiving the reflected light beams from the beam spots M, SL2, SL1, SR1, and SR2.

As shown in the figure, the phase difference between the tracking error signals TE is 360°÷5=72°.

In this case, the reproducing position can be selected from the positions that are obtained by dividing the track pitch into five portions. More specifically, the reproducing position can be adjusted as the position of the track phase 0° according to the selection of the tracking error signal TE-m, the position of the track phase 72° according to the selection of the tracking error signal TE-sl1, the position of the track phase 144° according to the selection of the tracking error signal TE-sl2, the position of the track phase 216° according to the selection of the tracking error signal TE-sr2, and the position of the track phase 288° according to the selection of the tracking error signal TE-sr1.

In addition, in the case where the five spots are used similarly to the above case, the procedure using the inverted signals can be adapted. For example, if the inverted signals of the tracking error signals TE-m, TE-sl1, TE-sl2, TE-sr1, and TE-sr2 are denoted by tracking error signals TE-mo, TE-sl1o, TE-sl2o, TE-sr1o, and TE-sr2o, the phases of the ten types of tracking error signals TE are as follows. Namely, TE-sr2o=36°, TE-sl1=72°, TE-sr1o=108°, TE-sl2=144°, TE-mo=180°, TE-sr2=216°, TE-sl1o=252°, TE-sr1=288°, and TE-sl2o=324° as the phase of the tracking error signal TE-m is set to 0°.

Therefore, in this case, the reproducing position can be adjusted as the position of the track phase 0° according to the selection of the tracking error signal TE-m, the position of the track phase 36° according to the selection of the tracking error signal TE-sr2o, the position of the track phase 72° according to the selection of the tracking error signal TE-sl1, the position of the track phase 108° according to the selection of the tracking error signal TE-sr1o, the position of the track phase 144° according to the selection of the tracking error signal TE-sl2, the position of the track phase 180° according to the selection of the tracking error signal TE-mo, the position of the track phase 216° according to the selection of the tracking error signal TE-sr2, the position of the track phase 252° according to the selection of the tracking error signal TE-sl1o, the position of the track phase 288° according to the selection of the tracking error signal TE-sr1, and the position of the track phase 324° according to the selection of the tracking error signal TE-sl2o. In other words, as clearly understood from this, in this case, the reproducing position can be adjusted finely at an accuracy of 1/10 times the track pitch.

In addition, although the case where the number of spots is set to five is exemplified herein, the number of spots of the position control light (second light) used for the spot position control according to the invention is not limited to three or five. If at least a plurality of spots is used, the reproducing position adjustment may be performed by using an adjustment width smaller than the track pitch.

In addition, even in the case where the number of spots is not set to three, the finer adjustment may be performed by allocating the offset similarly to the aforementioned modified example.

In addition, in the description hereinbefore, the case where the light spot position control apparatus according to the invention is adapted to a hologram recording/reproducing apparatus is exemplified. If an apparatus is configured to perform the information reproducing (and recording) through irradiation of the first light and control information reproducing (and recording) position by using the first light based on a result of irradiation of the second light, the light spot position control apparatus according to the invention may also be appropriately adapted to other apparatuses.

The present application contains subject matter related to that disclosed in Japanese Priority Patent Application JP 2009-095990 filed in the Japan Patent Office on Apr. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light spot position control apparatus comprising:
a first light source;
a second light source;
a beam splitter that splits a light beam emitted from the second light source into m light beams;
an optical system that allows a first light beam emitted from the first light source and the m light beams generated by the beam splitter to irradiate a disk-shaped recording medium, where grooves and lands are alternately formed with an equal width in a radial direction thereof so that the grooves are formed in a spiral shape or a concentric shape, through a common objective lens, wherein the optical system allows the m light beams to irradiate the disk-shaped recording medium so that an interval of irradiating spots of the m light beams irradiating the disk-shaped recording medium in the radial direction is 1/m of a pitch of tracks formed on the disk-shaped recording medium according to the formation of the grooves;

a tracking control mechanism that is configured to perform tracking control on the light beam irradiated through the objective lens by changing a relative positional relationship between the optical axis of the light beam irradiated through the objective leans and the disk-shaped recording medium in the radial direction;

a light receiving unit that individually receives the m light beams irradiated through the objective lens from disk-shaped recording medium;

an error signal generation unit that generates error signals representing radial position errors of the spot positions of the m light beams with respect to the tracks formed on the disk-shaped recording medium based on received signals obtained by the light receiving unit;

an error signal selector that selects at least one error signal among the error signals generated by the error signal generation unit; and a servo controller that controls the tracking control mechanism to perform the tracking servo on the light beam irradiated through the objective lens based on the error signal selected by the error signal selector.

2. The light spot position control apparatus according to claim 1, further comprising an inverted signal generation unit that generates inverted signals of the error signals generated by the error signal generation unit, wherein the error signal selector selects one error signal among the error signals generated by the error signal generation unit and the inverted signal generation unit.

3. The light spot position control apparatus according to claim 1, further comprising an offset allocating unit that allocates an offset to a tracking servo loop based on information of a designated correction amount.

4. The light spot position control apparatus according to claim 1, wherein, in the disk-shaped recording medium, a position separated by a predetermined interval in a circumferential direction in any one of the groove or the land is set to a pit formable position, and address information recording is performed according to a pattern of pit existence at the pit formable position, wherein the light spot position control apparatus further comprises:

a pit-existence-reflecting signal generation unit that generates a pit-existence-reflecting signal, which reflects the pit existence based on the received signals obtained by the light receiving unit; and an address detection unit that performs address information detection by detecting a pattern of the pit existence at pit formable positions based on the pit-existence-reflecting signal.

5. The light spot position control apparatus according to claim 4, wherein the pit-existence-reflecting signal generation unit generates the pit-existence-reflecting signal, which reflects the pit existence to the spot positions of the main light beam, the first light beam, and the second light beam from the received signals obtained by the light receiving unit, and wherein the address detection unit performs the address information detection based on one pit-existence-reflecting signal selected among the pit-existence-reflecting signals generated by the pit-existence-reflecting signal generation unit according to the error signal selected b the error signal selector.

6. A light spot position control method in a light spot position control apparatus which includes:

a first light source;

a second light source;

a beam splitter that splits a light beam emitted from the second light source into m light beams;

an optical system that allows a first light beam emitted from the first light source and the m light beams generated by the beam splitter to irradiate a disk-shaped recording medium, where grooves and lands are alternately formed with an equal width in a radial direction thereof so that the grooves are formed in a spiral shape or a concentric shape, through a common objective lens, wherein the optical system allows the m light beams to irradiate the disk-shaped recording medium so that an interval of irradiating spots of the m light beams irradiating the disk-shaped recording medium in the radial direction is 1/m of a pitch of tracks formed on the disk-shaped recording medium according to the formation of the grooves; and a tracking control mechanism that is configured to perform tracking control on the light beam irradiated through the objective lens by changing a relative positional relationship between the optical axis of the light beam irradiated through the objective lens and the disk-shaped recording medium in the radial direction, the light spot position control method comprising the steps of:

individually receiving the m light beams irradiated through the objective leans from the disk-shaped recording medium;

generating error signals representing radial position errors of the spot positions of the m light beams with respect to the tracks formed on the disk-shaped recording medium based on received signals obtained by the receiving;

selecting at least one error signal among the error signals generated by the generating error signals; and controlling the tracking control mechanism to perform the tracking servo on the light beam irradiated through the objective lens based on the error signal selected by the selecting the error signal.

* * * * *